(12) United States Patent
Tokura

(10) Patent No.: US 8,970,894 B2
(45) Date of Patent: Mar. 3, 2015

(54) PRINT PROCESSING APPARATUS FOR PRINTING A PRINT JOB HAVING A PAPER TYPE NOT INCLUDED IN A PAPER INFORMATION DATABASE

(75) Inventor: Yutaka Tokura, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 13/270,999

(22) Filed: Oct. 11, 2011

(65) Prior Publication Data

US 2012/0099148 A1 Apr. 26, 2012

(30) Foreign Application Priority Data

Oct. 22, 2010 (JP) ................................. 2010-237099

(51) Int. Cl.
G06F 3/12 (2006.01)

(52) U.S. Cl.
CPC ............ G06F 3/1284 (2013.01); G06F 3/1205 (2013.01); G06F 3/1211 (2013.01); G06F 3/1255 (2013.01)
USPC .......................... 358/1.18; 358/1.13; 358/1.15

(58) Field of Classification Search
CPC ... G06F 3/1204; G06F 3/1264; G06F 3/1208; G06F 3/1243; G06F 3/1247
USPC ................. 358/1.13, 1.15, 1.1, 1.9, 1.18, 1.16
See application file for complete search history.

(56) References Cited

U.S. PATENT DOCUMENTS

| 8,482,759 B2 * | 7/2013 | Utsunomiya ................. 358/1.15 |
| 2002/0097427 A1 | 7/2002 | Kazama |
| 2004/0008365 A1 | 1/2004 | Hobbs |
| 2006/0012807 A1 * | 1/2006 | Bos et al. ........................ 358/1.8 |
| 2007/0109587 A1 * | 5/2007 | Yamakawa .................... 358/1.14 |
| 2007/0263242 A1 * | 11/2007 | Takahashi .................... 358/1.14 |
| 2007/0264039 A1 * | 11/2007 | Saito et al. ...................... 399/81 |
| 2008/0025378 A1 | 1/2008 | Mahany et al. |
| 2008/0204800 A1 * | 8/2008 | Ushiku ........................ 358/1.15 |
| 2008/0253782 A1 | 10/2008 | Honguh |

FOREIGN PATENT DOCUMENTS

| JP | 2007-140786 A | 6/2007 |
| JP | 2008-186255 A | 8/2008 |
| JP | 2008-217562 A | 9/2008 |

* cited by examiner

*Primary Examiner* — Dennis Dicker
(74) *Attorney, Agent, or Firm* — Canon U.S.A., Inc. IP Division

(57) ABSTRACT

Before transmitting a print job to a printing apparatus, a CPU of a print processing apparatus determines whether paper information designated in the print job has been registered in a paper information database of the print processing apparatus. If the paper information has not been registered, the CPU extracts paper information similar to the paper information designated in the print job from those stored in the paper information database of the print processing apparatus. Furthermore, the CPU copies information about the dependency on the printing apparatus, which is included in the extracted paper information (printer dependency information) to the paper information designated in the print job. Then, the CPU registers the paper information designated in the print job, to which the printer dependency information has been copied, in a paper information database of the printing apparatus and transmits the print job to the printing apparatus.

18 Claims, 20 Drawing Sheets

FIG.8

DETAILED SETTING/EDIT

| | | |
|---|---|---|
| ☐ LEVEL OF AIR FLOW FROM PAPER SEPARATION FAN | ▷ MIDDLE | [CHANGE ▲] |
| ☐ ADJUSTMENT OF IMAGE LOCATION | ▷ NOT TO BE ADJUSTED | [CHANGE ▲] |
| ☐ ADJUSTMENT OF SECONDARY TRANSFER VOLTAGE | ▷ 0 | [CHANGE ▲] |

801

[CLOSE ⏎] 802

DETAILED SETTING/EDIT

| | | |
|---|---|---|
| ☐ NAME | ▷ custom-new-1 | |
| ☐ TYPE | ▷ USER-SET PAPER (EDITED) | [CHANGE ▲] |
| ☐ GRAMMAGE | ▷ 85 g/m² | [CHANGE ▲] |
| ☐ PARTICULAR CHARACTERISTIC | ▷ NONE | [CHANGE ▲] |
| ☐ SURFACE CHARACTERISTIC | ▷ RECYCLED PAPER | [CHANGE ▲] |
| ☐ RECYCLED PAPER | ▷ 0.00mm | [CHANGE ▲] |
| ☐ COLOR | ▷ RED | [CHANGE ▲] |
| ☐ CURL CORRECTION AMOUNT | ▷ 0 | [CHANGE ▲] |
| ☐ ADJUSTMENT OF GLOSSINESS | ▷ 0 | [CHANGE ▲] |

[◀] 1/2 [▶]        [CLOSE ⏎]

| TYPE AND SIZE (901) | SURFACE CHARACTERISTIC (902) | GRAMMAGE (903) | | | | | | | |
|---|---|---|---|---|---|---|---|---|---|
| | | 52~63 | 64~90 | 91~105 | 106~128 | 129~150 | 151~180 | 181~220 | 221~256 | 257~300 |
| NORMAL | QUALITY PAPER | THIN PAPER | NORMAL PAPER 1 | NORMAL PAPER 2 | THICK PAPER 1 | | | THICK PAPER 2 | THICK PAPER 3 | THICK PAPER 4 |
| | RECYCLED PAPER | | RECYCLED PAPER 1 | RECYCLED PAPER 2 | | | | | | |
| | ONE SIDE-COATED PAPER | | | | ONE SIDE-COATED PAPER 1 | | | ONE SIDE-COATED PAPER 2 | ONE SIDE-COATED PAPER 3 | ONE SIDE-COATED PAPER 4 |
| | TWO SIDE-COATED PAPER | | | | TWO SIDE-COATED PAPER 1 | | | TWO SIDE-COATED PAPER 2 | TWO SIDE-COATED PAPER 3 | TWO SIDE-COATED PAPER 4 |
| | EMBOSSED PAPER | | | | EMBOSSED PAPER 1 | | EMBOSSED PAPER 2 | | EMBOSSED PAPER 3 | EMBOSSED PAPER 4 |
| | VELLUM | | SECOND ORIGINAL DRAWING | | | | | | | |
| | FILM | | | | | | OHP | | | |
| | LABELED PAPER | | | | | | LABELED PAPER | | | |
| | COTTON | | BOND PAPER | | | | | | | |
| | POSTCARD | | | | | | | POSTCARD, 4-BLOCK POSTCARD | | |
| TAB PAPER | QUALITY PAPER | | | | | | TAB PAPER 1 | TAB PAPER 2 | | |
| PUNCHED PAPER | QUALITY PAPER | | THREE-HOLE PUNCHER | | | | | | | |
| LETTERHEAD | QUALITY PAPER | | | | | | LETTERHEAD | | | |
| ENVELOPE | QUALITY PAPER | | | | | | | ENVELOPE | | |
| NORMAL | EMBOSSED PAPER | | | | | | | | | |
| WATERPROOF PAPER | | | | | | | | | | |

FIG.10

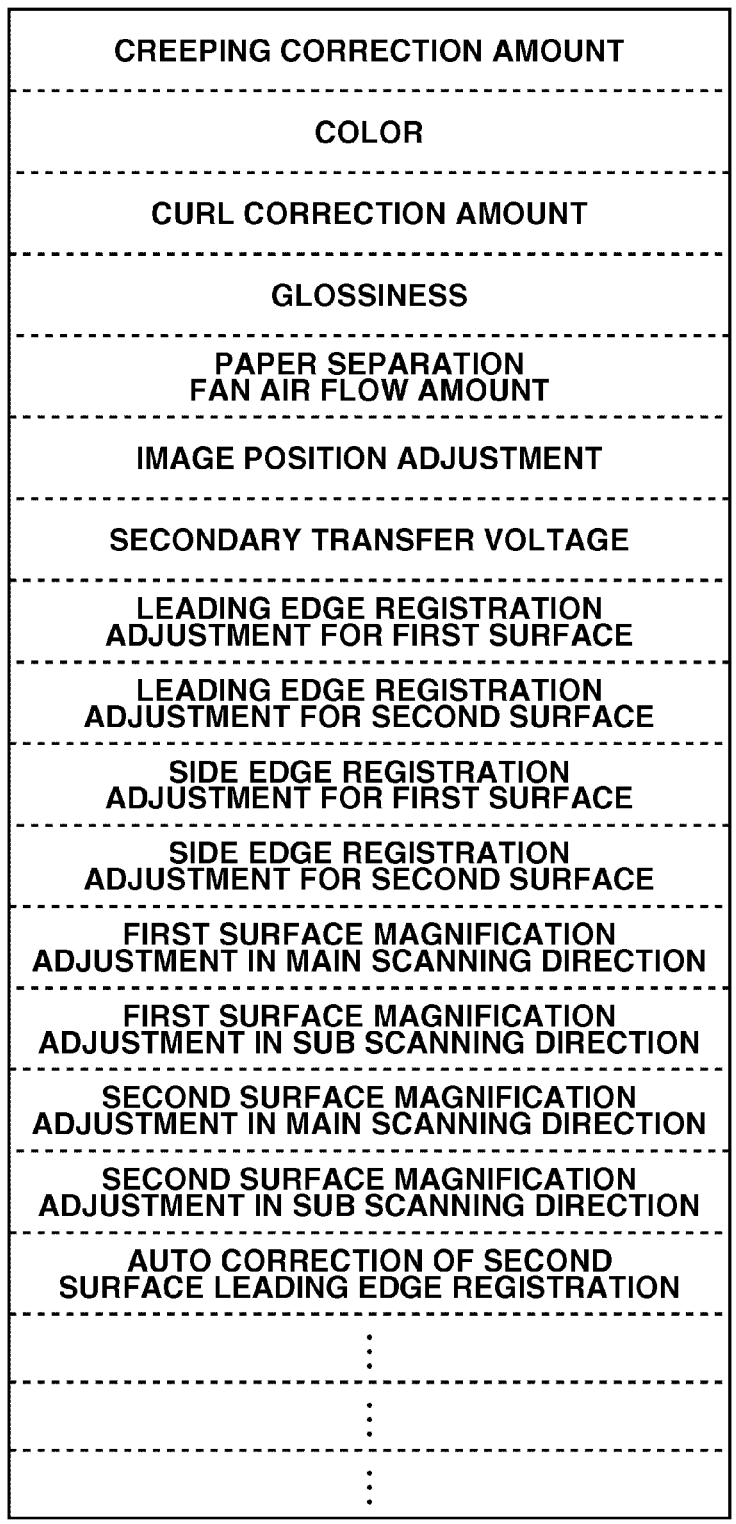

| CREEPING CORRECTION AMOUNT |
| --- |
| COLOR |
| CURL CORRECTION AMOUNT |
| GLOSSINESS |
| PAPER SEPARATION FAN AIR FLOW AMOUNT |
| IMAGE POSITION ADJUSTMENT |
| SECONDARY TRANSFER VOLTAGE |
| LEADING EDGE REGISTRATION ADJUSTMENT FOR FIRST SURFACE |
| LEADING EDGE REGISTRATION ADJUSTMENT FOR SECOND SURFACE |
| SIDE EDGE REGISTRATION ADJUSTMENT FOR FIRST SURFACE |
| SIDE EDGE REGISTRATION ADJUSTMENT FOR SECOND SURFACE |
| FIRST SURFACE MAGNIFICATION ADJUSTMENT IN MAIN SCANNING DIRECTION |
| FIRST SURFACE MAGNIFICATION ADJUSTMENT IN SUB SCANNING DIRECTION |
| SECOND SURFACE MAGNIFICATION ADJUSTMENT IN MAIN SCANNING DIRECTION |
| SECOND SURFACE MAGNIFICATION ADJUSTMENT IN SUB SCANNING DIRECTION |
| AUTO CORRECTION OF SECOND SURFACE LEADING EDGE REGISTRATION |
| ⋮ |
| ⋮ |
| ⋮ |

FIG.11

| | 1101 | 1102 | 1103 | 1104 | 1105 |
|---|---|---|---|---|---|
| | DELETE | COPY | EDIT | IMPORT | EXPORT |

| TRAY | NAME | GRAMMAGE (gsm) | TEXTURE | DETAILED TYPE |
|---|---|---|---|---|
| | THICK PAPER 4 (181~209 g/m²) | 195 | SMOOTHNESS | NORMAL |
| | THICK PAPER 3 (151~180 g/m²) | 166 | SMOOTHNESS | NORMAL |
| | INDEX PAPER...9 g/m²) | 195 | SMOOTHNESS | PRE-CUT TAB |
| | THICK PAPER 5 (210~256 g/m²) | 233 | SMOOTHNESS | NORMAL |
| | RECYCLED PAPER 2 (80~105 g/m²) | 93 | | NORMAL |
| | custom-new-1 | 85 | SMOOTHNESS | NORMAL |
| | RECYCLED PAPER 3 (15...180 g/m²) | 166 | | NORMAL |
| | RECYCLED PAPER 4 (21...256 g/m²) | 233 | | NORMAL |
| | EMBOSSED PAPER 1 (8...05 g/m²) | 93 | LINEN EMBOSS | NORMAL |
| | EMBOSSED PAPER 2 (1...28 g/m²) | 117 | LINEN EMBOSS | NORMAL |
| | EMBOSSED PAPER 3 (1...50 g/m²) | 140 | LINEN EMBOSS | NORMAL |
| | EMBOSSED PAPER 4 (1...80 g/m²) | 166 | LINEN EMBOSS | NORMAL |
| | EMBOSSED PAPER 5 (1...09 g/m²) | 195 | LINEN EMBOSS | NORMAL |
| | EMBOSSED PAPER 6 (2...56 g/m²) | 233 | LINEN EMBOSS | NORMAL |
| | VELLUM PAPER 2 (10...28 g/m²) | 117 | VELLUM | NORMAL |
| | PUNCHED PAPER...05 g/m²) | 93 | SMOOTHNESS | NORMAL |
| | ONE SIDE-COATED PAPER 1...8 g/m²) | 117 | | NORMAL |
| | ONE SIDE-COATED PAPER 2...0 g/m²) | 140 | | NORMAL |

PAPER TYPE SETTING

PAPER TO BE DISPLAYED (P): [ ALL ▶ ]
PAPER TYPE (T):

| NAME | TYPE | GRAMMAGE | PARTICULAR CHARACTERISTIC | SURFACE CHARACTERISTIC | COLOR |
|---|---|---|---|---|---|
| NORMAL PAPER 1 | BASIC PAPER | 77 g/m | NONE | QUALITY PAPER | WHITE |
| custom-new-1 | USER-SET PAPER | 85 g/m | NONE | RECYCLED PAPER | RED |
| NORMAL PAPER 2 | BASIC PAPER | 85 g/m | NONE | QUALITY PAPER | WHITE |
| ONE SIDE-COATED PAPER 1 | BASIC PAPER | 143 g/m | NONE | ONE SIDE-COATED PAPER | WHITE |
| custom-new-2 | USER-SET PAPER | 150 g/m | NONE | QUALITY PAPER | YELLOW |
| custom-new-3 | USER-SET PAPER | 130 g/m | NONE | EMBOSSED PAPER | WHITE |

1300

[ GENERATE NEW PAPER TYPE ]

[ OK ] [ CANCEL ] [ HELP (H) ]

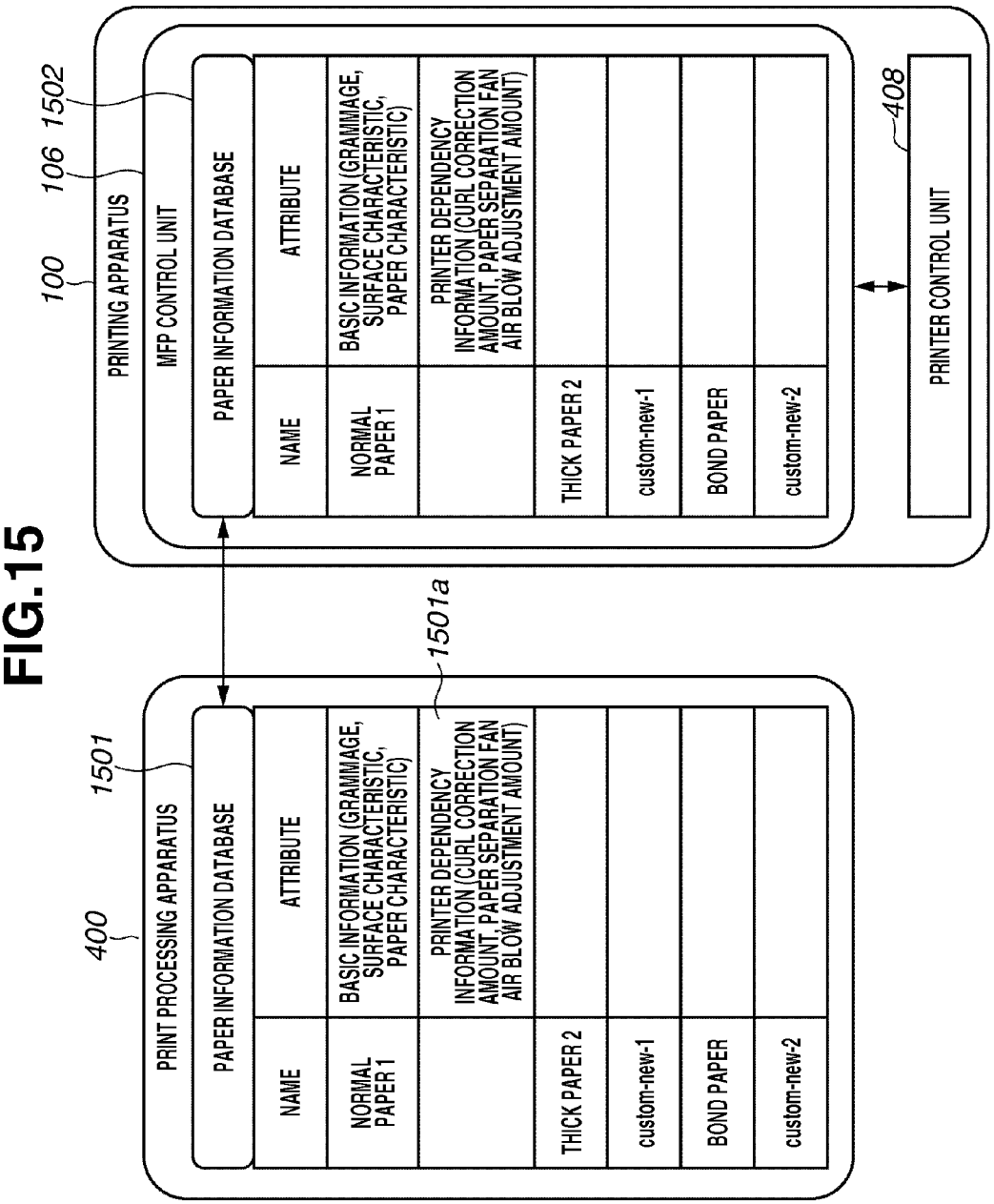

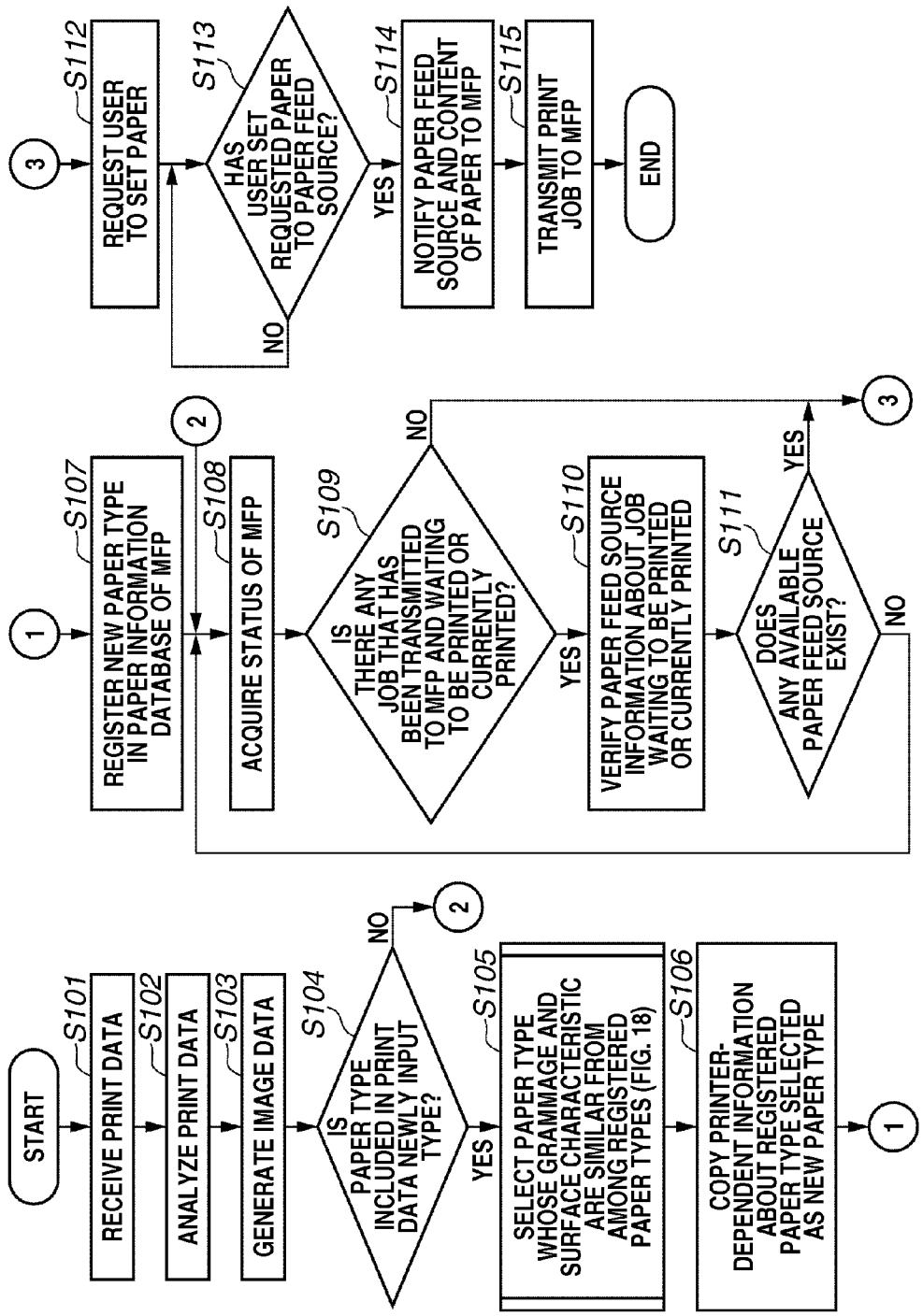

FIG.17

| BASIC PAPER | |
|---|---|
| NAME | RECYCLED PAPER 1 |
| GRAMMAGE | 77 |
| SURFACE CHARACTERISTIC | RECYCLED PAPER |
| PARTICULAR CHARACTERISTIC | NONE (NORMAL) |
| CREEPING CORRECTION AMOUNT | 0.10 |
| COLOR | WHITE |
| CURL CORRECTION AMOUNT | +1 |
| GLOSSINESS | -2 |
| PAPER SEPARATION FAN AIR FLOW AMOUNT | LOW |
| ⋮ | ⋮ |
| ⋮ | ⋮ |
| SECOND SURFACE MAGNIFICATION ADJUSTMENT IN SUB SCANNING DIRECTION | -3 |
| ⋮ | ⋮ |
| ⋮ | ⋮ |

| USER SETTING PAPER | |
|---|---|
| NAME | custom-new-5 |
| GRAMMAGE | 85 |
| SURFACE CHARACTERISTIC | RECYCLED PAPER |
| PARTICULAR CHARACTERISTIC | NONE (NORMAL) |
| CREEPING CORRECTION AMOUNT | |
| COLOR | |
| CURL CORRECTION AMOUNT | |
| GLOSSINESS | |
| PAPER SEPARATION FAN AIR FLOW AMOUNT | |
| ⋮ | ⋮ |
| ⋮ | ⋮ |
| SECOND SURFACE MAGNIFICATION ADJUSTMENT IN SUB SCANNING DIRECTION | |
| ⋮ | ⋮ |
| ⋮ | ⋮ |

FIG.19

| STATUS OF PRINT JOB IN PRINT PROCESSING APPARATUS | STATUS OF PRINT JOB IN MFP CONTROL UNIT |
|---|---|
| JOB 1: PRINTING IN PROCESS<br>PAPER INFORMATION: A4, NORMAL PAPER 1<br>PAPER FEED INFORMATION: CASSETTE 1 | JOB 1: PRINTING IN PROCESS<br>PAPER INFORMATION: A4, NORMAL PAPER 1<br>PAPER FEED INFORMATION: CASSETTE 1 |
| JOB 2: ALREADY TRANSMITTED + WAITING TO BE PRINTED<br>PAPER INFORMATION: A3, THICK PAPER 1<br>PAPER FEED INFORMATION: CASSETTE 2 | JOB 2: ALREADY TRANSMITTED + WAITING TO BE PRINTED<br>PAPER INFORMATION: A3, THICK PAPER 1<br>PAPER FEED INFORMATION: CASSETTE 2 |
| JOB 3: ALREADY TRANSMITTED + WAITING TO BE PRINTED<br>PAPER INFORMATION: B5, NORMAL PAPER<br>PAPER FEED INFORMATION: CASSETTE 3 | JOB 3: ALREADY TRANSMITTED + WAITING TO BE PRINTED<br>PAPER INFORMATION: B5, NORMAL PAPER<br>PAPER FEED INFORMATION: CASSETTE 3 |
| JOB 4: ALREADY TRANSMITTED + WAITING TO BE PRINTED<br>PAPER INFORMATION: A4, BOND PAPER<br>PAPER FEED INFORMATION: CASSETTE 4 | JOB 4: ALREADY TRANSMITTED + WAITING TO BE PRINTED<br>PAPER INFORMATION: A4, BOND PAPER<br>PAPER FEED INFORMATION: CASSETTE 4 |
| JOB 5: ALREADY TRANSMITTED + WAITING TO BE PRINTED<br>PAPER INFORMATION: A4, NORMAL PAPER<br>PAPER FEED INFORMATION: CASSETTE 1 | JOB 5: ALREADY TRANSMITTED + WAITING TO BE PRINTED<br>PAPER INFORMATION: A4, NORMAL PAPER<br>PAPER FEED INFORMATION: CASSETTE 1 |
| JOB 6: RIP COMPLETED + WAITING TO BE TRANSMITTED<br>PAPER INFORMATION: A4, CUSTOM-NEW-5<br>PAPER FEED INFORMATION: CASSETTE 2 | |
| JOB 7: WAITING FOR RIP<br>PAPER INFORMATION: A4, NORMAL PAPER<br>PAPER FEED INFORMATION: CASSETTE 1 | |

PRINT PROCESSING APPARATUS FOR PRINTING A PRINT JOB HAVING A PAPER TYPE NOT INCLUDED IN A PAPER INFORMATION DATABASE

BACKGROUND OF THE INVENTION

1. Field of the Invention

The present invention relates to a print processing apparatus, a print processing apparatus control method, and a storage medium.

2. Description of the Related Art

In a print on demand (POD) market, various types of paper are used as a print medium according to the desire of a customer. Accordingly, a recently marketed digital MFP (MFP) for the POD market can utilize a user-defined type of paper, to which the user can execute a detailed setting, such as the grammage, the surface smoothness, and the shape of the paper in addition to standard type paper, which is generally used.

As the paper type that can be utilized in printing, a conventional method discussed in Japanese Patent Application Laid-Open No. 2008-217562 includes a first storage unit, which stores the paper type that is a candidate of the paper to be utilized in printing and a second storage unit, which stores the paper type that can be utilized in actual printing. In addition, a printing apparatus of the method discussed in Japanese Patent Application Laid-Open No. 2008-217562 includes a notification unit which notifies the paper type stored in the first unit and a registration unit, which registers the paper type designated by a user operating an operation unit on the second storage unit.

On the other hand, it has become the mainstream in the POD market to construct a POD environment by connecting, to a digital MFP for the POD market, an image processing apparatus capable of operating in cooperation with a work flow application, which enables processing from order taking to the delivery of a product to be easily executed, capable of executing printing with a high accuracy, and capable of generating an image at a high processing speed.

However, the following problem may arise because the method of Japanese Patent Application Laid-Open No. 2008-217562 does not discuss a method for corresponding to various types of paper in a system which connects a high-performance print processing apparatus with a digital MFP.

In order to operate in cooperation with a work flow application, a print processing apparatus includes a storage unit that stores information about the paper type with which the print processing apparatus complies. A work flow is generated by sharing the above-described information about the paper type by a plurality of processing functions. However, the information stored in the storage unit, which stores the paper type that can be used on the print processing apparatus may not always match the information stored in a storage area that stores the paper type that can be used on the digital MFP.

Although the paper type, which exists on the storage unit that stores the paper type that can be used on the print processing apparatus only can be designated on the work flow, printing may not be actually executed because the designated paper type does not exist on the storage area that stores the paper type that can be used on the digital MFP when the printing is actually executed on the digital MFP.

In addition, if the paper type included in a print instruction from the print processing apparatus exists on the storage area that stores the paper type that can be used on the digital MFP but does not exist in a paper feed source of the digital MFP (i.e., a sheet storage unit, such as a paper feed cassette), the digital MFP makes a request to set the paper, to the user.

A print processing apparatus, can execute image generation processing and processing for transmitting print data to a digital MFP at a high speed. Accordingly, the digital MFP may often store a plurality of print instructions from the print processing apparatus in addition to the currently processed print instruction.

In this case, the digital MFP does not verify the status of the paper feed source designated by the print instruction until an analysis of the print instruction is started. Accordingly, the paper request to the user who has been previously recognized by the print processing apparatus may be delayed.

As a result, during an operation for replenishing the sheet to the paper feed source by the user, downtime may arise on the digital MFP. Accordingly, the total productivity may degrade.

The present invention is intended to solve the above-described problem. In addition, the present invention is intended to provide a method that enables printing of a print job handling a type of paper that is not included in a paper information database of a printing apparatus by using the printing apparatus.

SUMMARY OF THE INVENTION

The present invention is directed to a method that enables printing of a print job handling a type of paper that is not included in a paper information database of a printing apparatus by using the printing apparatus.

According to an aspect of the present invention, a print processing apparatus configured to process an input print job and configured to transmit the processed print job to a printing apparatus, the print processing apparatus includes a storage unit configured to store paper information about paper, in which the paper information includes dependency information that describes a dependency on the printing apparatus, an identification unit configured, if the paper information included in the input print job has not been stored in the storage unit, to identify paper information corresponding to the paper information included in the print job from among pieces of paper information stored in the storage unit, a registration unit configured to register the paper information included in the print job in the printing apparatus by using the dependency information included in the paper information identified by the identification unit, and a control unit configured to control the printing apparatus to execute the print job by using the paper information registered in the registration unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 8 illustrates an example of a paper type detailed setting/editing screen, which is displayed on the LCD of the operation unit.

FIG. 9 illustrates an example of paper basic information.

FIG. 10 illustrates an example of printer dependency information.

FIG. 11 illustrates an example of a paper type management setting screen displayed on the print processing apparatus.

FIG. 13 illustrates an example of a paper type setting screen.

FIG. 15 illustrates an example of a paper information database, which manages the paper type and which is provided in the print processing apparatus and an MFP control unit of the MFP.

FIG. 16 is a flowchart illustrating an exemplary flow of processing from receiving of print data to printing of the print data, which is executed by the print processing apparatus.

FIG. 17 illustrates an exemplary operation for copying printer dependency information about basic paper, on user-set paper.

FIG. 19 illustrates an example of a state of a print job processed by the print processing apparatus and the MFP control unit.

DESCRIPTION OF THE EMBODIMENTS

Various exemplary embodiments, features, and aspects of the invention will be described in detail below with reference to the drawings.

Figure 1:
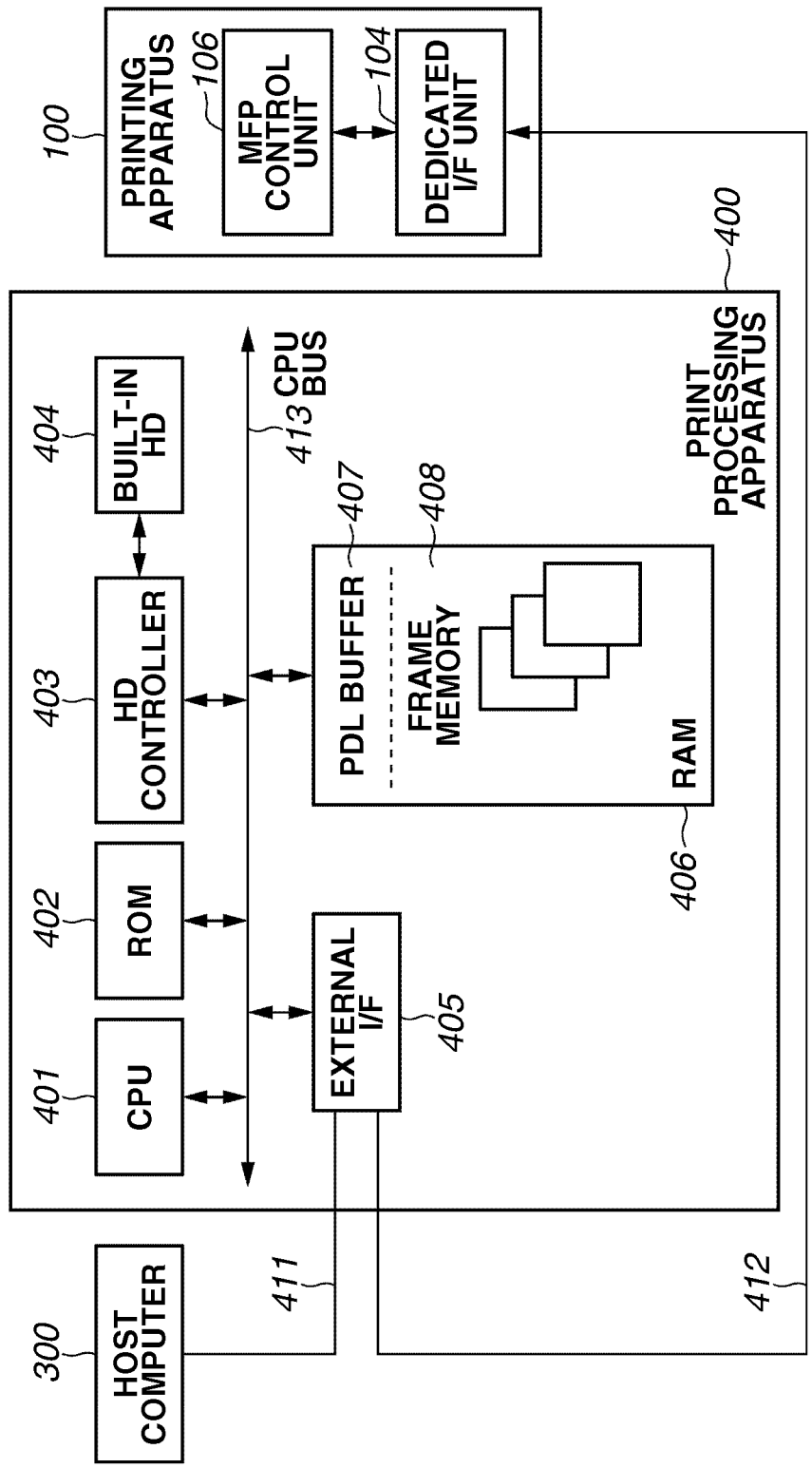
FIG. 1 is a block diagram illustrating an exemplary configuration of a printing system to which a print processing apparatus according to an exemplary embodiment of the present invention can be applied.

FIG. 1 is a block diagram illustrating an exemplary configuration of a printing system to which a print processing apparatus according to a first exemplary embodiment of the present invention can be applied. Referring to FIG. 1, a printing system according to the present exemplary embodiment includes a host computer 300, a print processing apparatus 400, and a printing apparatus 100. The host computer 300, the print processing apparatus 400, and the printing apparatus 100 are in communication with one another via a cable 411 or a cable 412.

The host computer 300 functions as a supply source of print data. In the present exemplary embodiment, the print data may also be described as page description language (PDL) data, which the print processing apparatus 400 can interpret.

The print processing apparatus 400 processes a print job input by the host computer 300, and transmits the input print job to the printing apparatus 100. In the following description, the processing by the print processing apparatus 400 will be described in detail.

The print processing apparatus 400 temporarily stores the print data (periphery data) supplied from the host computer 300 via the cable 411 and an external I/F 405 on an internal hard disk (internal HD) via an HD controller 403. The page description language (PDL) data stored in the internal HD 404 is temporarily stored in a PDL buffer 407 via a central processing unit (CPU) bus 413.

A CPU 401 of the print processing apparatus 400 analyzes the PDL data stored in the PDL buffer 407. In addition, the CPU 401 serially processes the PDL data in the unit of a page. Furthermore, the CPU 401 generates image data by rasterizing the data on a frame memory 408. The image data rasterized on the frame memory 408 is then transferred to the printing apparatus 100 via the cable 412 under control of the CPU 401. Then the image data is printed on a recording medium. As the cables 411 and 412, a general-purpose cable, such as a parallel cable, a small computer systems interface (SCSI) cable, a serial cable, or a network cable, or a dedicated cable can be used.

The CPU 401 of the print processing apparatus 400 transmits the image data to the printing apparatus 100. In addition, the CPU 401 transmits print control information for controlling printing of the image data to the printing apparatus 100 via a cable 212. The printing apparatus 100 prints the received image data based on the print control information. The print control information is information for controlling an operation of the printing apparatus 100. The print control information includes a designation of a paper discharge tray on which a print product is to be discharged and a designation of the paper to be fed.

The internal HD 404 stores a font, a color profile, and various types of parameter tables that are commonly handled, such as a gamma table and a paper information database, in addition to the print data, as described above.

The print processing apparatus 400 is capable of calling various parameter tables from the internal HD 404 where necessary and can update various parameter tables by adding information to or modifying the information stored in the parameter table. The CPU 401 operates according to a control program stored in a read-only memory (ROM) 402. The CPU 401 controls various functions of the print processing apparatus 400.

The internal HD 404 includes an area for temporarily storing printed PDL data and the image data generated by rasterizing the PDL data. In addition, the internal HD 404 includes an area for storing font data. Furthermore, the internal HD 404 is connected to the CPU bus 413 via the HD controller 403.

A random access memory (RAM) 406 includes the PDL buffer 407, which is a buffer for temporarily storing the PDL data received from 30. In addition, the RAM 406 includes the frame memory 408, which temporarily stores the rasterized image data.

The printing apparatus 100 serves as a printer that outputs the PDL data generated in the host computer 300, and further serves as a copying device for copying a document or as a scanner.

The print processing apparatus 400 acquires status information about the printing apparatus 100 via the cable 412. In addition, the print processing apparatus 400 transmits the acquired status information about the printing apparatus 100 to the host computer 300. Furthermore, the print processing apparatus 400 controls the printing apparatus 100 according to the status information about the printing apparatus 100.

The ROM 402 can be constituted by a programmable memory, such as an electrically erasable programmable ROM (EEPROM), to enable installation of a control program to the ROM 402 from the host computer 300. In addition, a recording medium constituted by memory medium, such as a Floppy® disk (FD) or a compact disc-read only memory (CD-ROM), and by a controller (a driver) of the medium, can be provided to record a computer-executable program on the recording medium.

Now, an exemplary configuration of the printing apparatus 100 will be described in detail below with reference to FIG. 2.

In the present exemplary embodiment, the printing apparatus may also be referred to as an MFP. The MFP includes a memory, such as a hard disk, which is capable of storing data of a plurality of jobs within the apparatus. In addition, the MFP includes a copy function for printing scan data acquired by a scanner, using a printer unit.

In addition, the MFP includes a printing function for printing PDL data output from an external apparatus, such as a computer. As described above, the MFP is an image forming apparatus having a plurality of functions.

The MFP includes a full color MFP and a monochromatic MFP. The full color MFP includes the basic configuration of the monochromatic MFP except a color processing function and internal data. Accordingly, in the present invention, the full color MFP will be primarily described. The monochromatic MFP will be additionally described where necessary.

For the configuration of the system, as described above, the system can include a multifunction type image forming apparatus (MFP) having a plurality of functions. In addition, the system can include a single-function image forming apparatus having a printing function only. The single-function image forming apparatus will be described as a "single function peripheral (SFP)".

Further, the system of the present invention can include a plurality of image forming apparatuses of any type. To paraphrase this, the system of the present invention can have any configuration that can implement the control according to the present exemplary embodiment.

Figure 2:
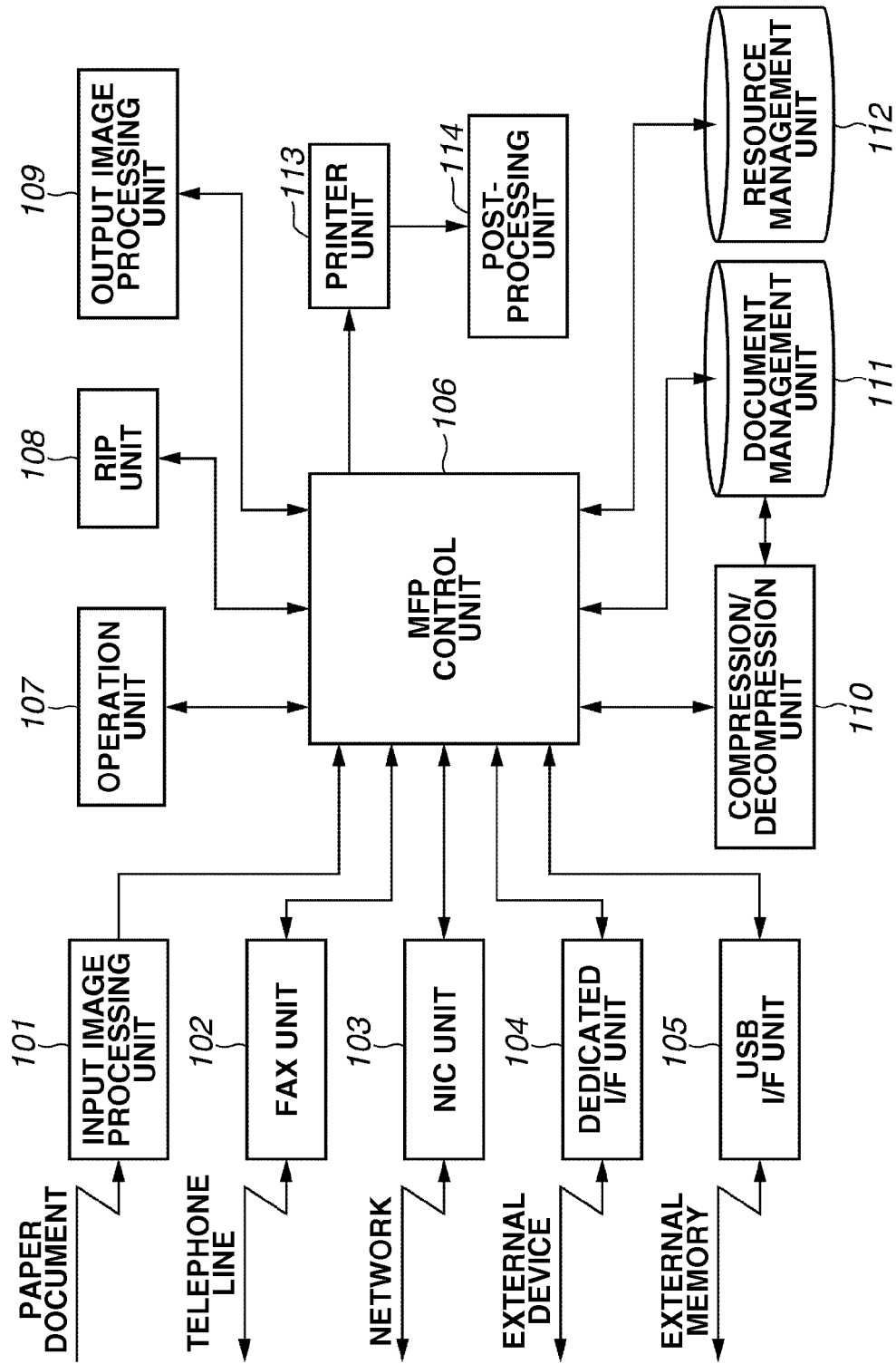
FIG. 2 is a block diagram illustrating an example of a configuration of the printing apparatus.

FIG. 2 is a block diagram illustrating an example of a configuration of the printing apparatus 100. In the following description, the printing apparatus 100 is referred to as the MFP 100.

Referring to FIG. 2, an input image processing unit 101 reads an image, such as a paper document. In addition, the input image processing unit 101 executes image processing on the read image data.

A FAX transmission unit 102 transmits and receives an image by utilizing a telephone line such as facsimile.

A network interface card (NIC) unit 103 transmits image data and device information via a network. A dedicated interface (I/F) unit 104 exchanges information, such as image data, with an external apparatus. A universal serial bus (USB) I/F unit 105 transmits and receives image data etc. to and from a USB device, such as a USB memory (a removable medium). An MFP control unit 106 functions to control the data traffic to temporarily store image data or to determine a data transmission path according to the use of the MFP.

A document management unit 111 includes a memory, such as a hard disk, capable of storing a plurality of pieces of image data. For example, a control unit included in the image forming apparatus (a CPU of the MFP control unit 106) performs a key role in storing image data input via the input image processing unit 101, the FAX transmission unit 102, the NIC unit 103, the dedicated I/F unit 104, and the USB I/F unit 105 in the document management unit 111.

In addition, the MFP control unit 106 reads necessary image data from the document management unit 111. Furthermore, the MFP control unit 106 transfers the read image data to an output unit, such as a printer unit 113, and controls print processing performed by the printer unit 113. In addition, the MFP control unit 106 transfers the image data read from the document management unit 111 to an external apparatus, such as a computer or other image forming apparatuses under control of an operator.

In storing image data in the document management unit 111, a compression/decompression unit 110 compresses image data where necessary and stores the compressed image data in the document management unit 111. On the other hand, in reading the compressed image data from the document management unit 111, the compression/decompression unit 110 decompresses the compressed data into image data of original data size.

When data is communicated via a network, the data is usually communicated in the form of compressed data, such as Joint Photographic Experts Group (JPEG) data, Joint Bi-level Image Experts Group (JBIG) data, or as a ZIP file. After the data is input to the MFP, the compression/decompression unit 110 decompresses the compressed data.

A resource management unit 112 stores a font, a color profile, and various types of parameter tables that are commonly handled, such as a gamma table and a paper information database. The resource management unit 112 can call the stored information and the table where necessary. In addition, the resource management unit 112 can store, modify, or update a new parameter table.

If PDL data has been input, the MFP control unit 106 executes control for performing raster image processing (RIP) on the input PDL data by using an RIP unit 108. Further, the MFP control unit 106 executes control for performing image processing in printing the image to be printed by using an output image processing unit 109.

Intermediate data of the image data generated during the above-described processing and print-ready data (i.e., bitmap data for printing and data generated by compressing the bitmap data) can be stored in the document management unit 111 again under control of the MFP control unit 106 where necessary. The data that has been image-processed for printing is then transmitted to the printer unit 113, which forms an image.

The sheet having the image printed by the printer unit 113 thereon is then conveyed into a post-processing unit 114. The post-processing unit 114 executes processing for sorting the sheet and sheet finishing processing.

In particular, the MFP control unit 106 functions to smoothly execute the job. More specifically, the MFP control unit 106 changes the path in the following manner according to the use of the MFP. Although it is generally known that image data is stored as intermediate data where necessary, accesses other than an access in which the document management unit 111 functions as a first unit or a last unit for processing will not be described in the present exemplary embodiment.

In the following description, the flow of the processing according to the present exemplary embodiment will be simply described for easier understanding by omitting processing by the compression/decompression unit 110 and the post-processing unit 114, which are utilized where necessary, or the MFP control unit 106, which is the core unit for executing the operation of the entire MFP.

Copy function: input image processing unit→output image processing unit→printer unit FAX transmission function: input image processing unit→FAX unit FAX receiving function: FAX unit→output image processing unit→printer unit Network scanning: input image processing unit→NIC unit Network printing: NIC unit→RIP unit→output image processing unit→printer unit Scanning to external apparatus: input image processing unit→dedicated I/F unit Printing from external apparatus: dedicated I/F unit→output image processing unit→printer unit Scanning to external memory: input image processing unit→USB I/F unit Printing from external memory: USB I/F unit→RIP unit→output image processing unit→printer unit Box scanning function: input image processing unit→output image processing unit→document management unit Box print function: document management unit→printer unit Box receiving function: NIC unit→RIP unit→output image processing unit→document management unit Box transmission function: document management unit→NIC unit Preview function: document management unit→operation unit In addition to the above-described functions, a combination with various other functions, such as an e-mail service or a web server function, can be used. However, the combination with various other functions will not be described here.

The box scan function, the box printing function, the box receiving function, or the box transmission function is a processing function of the MFP for writing or reading data, which is implemented by using the document management unit 111. The MFP control unit 106 divides a memory of the document management unit 111 into a plurality of areas for each job or each user, temporarily stores data in the divided areas, and inputs and outputs data according to a combination of a user ID and a password.

Via an operation unit 107, the user can select any of various flows or functions or input an instruction for executing an operation. Along with the high resolution of a display device included in the operation unit 107, image data stored in the document management unit 111 can be previewed via the operation unit 107 and if the user verifies the data as appropriate, he can print the data via the operation unit 107.

The operation unit 107 includes a liquid crystal display (LCD), and a touch panel display, which includes a transparent electrode and is attached to the LCD. The operation unit 107 displays various operation screens on the LCD according to a user setting and a user operation.

When the user touches the transparent electrode provided in a portion corresponding to a key displayed on the LCD with his finger, the MFP 100 detects that the portion has been touched with the user's finger and may display another operation screen. The above-described processing is executed according to a previously installed program.

Figure 3:
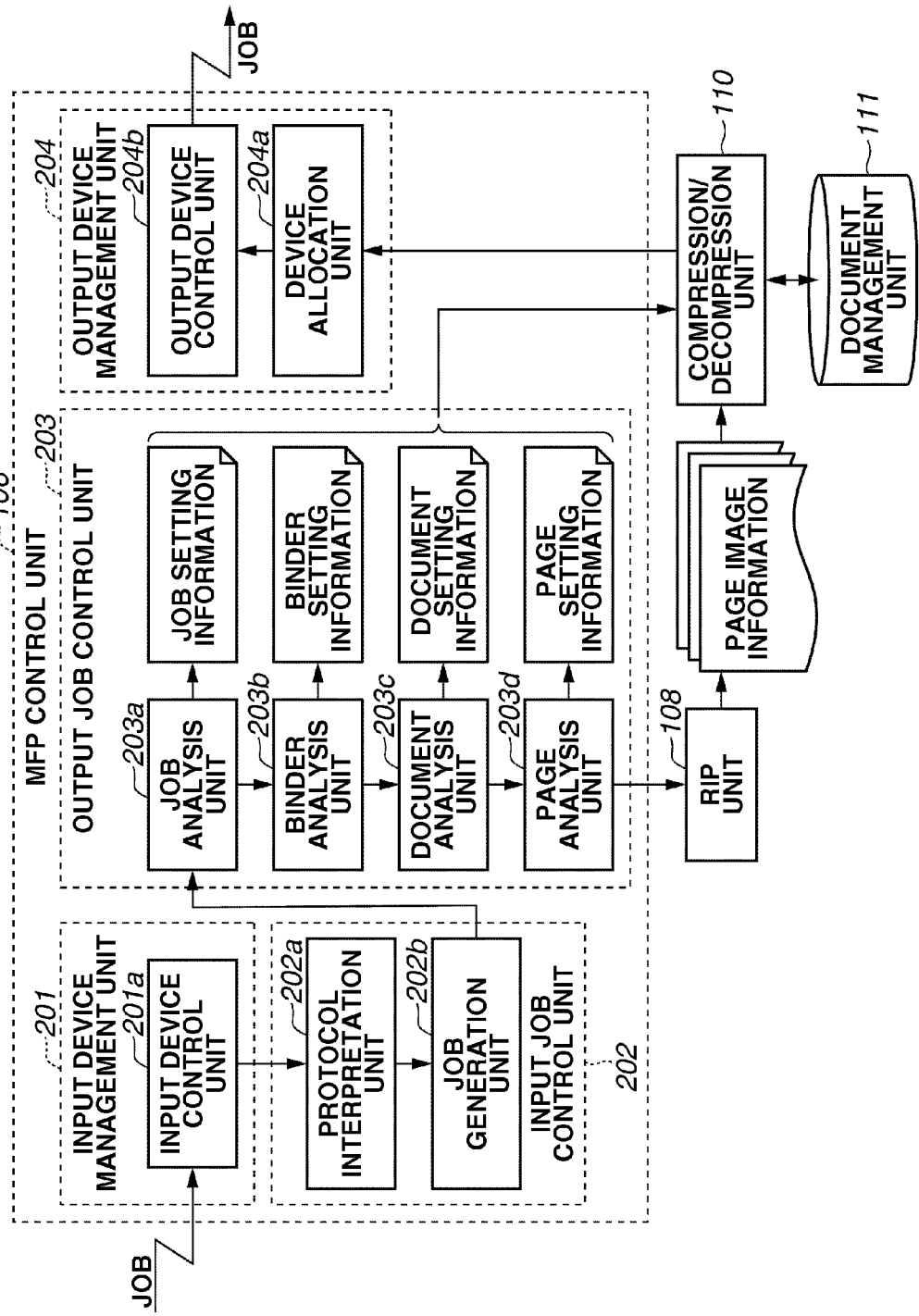
FIG. 3 is a block diagram illustrating an example of a configuration of an MFP control unit.

The MFP control unit 106 will be described in detail below with reference to FIG. 3. FIG. 3 is a block diagram illustrating an example of a configuration of the MFP control unit 106.

Referring to FIG. 3, the MFP control unit 106 is basically constituted by four portions. In other words, the MFP control unit 106 includes an input device management unit 201, an input job control unit 202, an output job control unit 203, and an output device management unit 204. The input device management unit is configured to manage an input device. The input job control unit 202 is configured to interpret an input job. The output job control unit is configured to process and control job setting information. The output device management unit 204 is configured to allocate an output device.

The input device management unit 201 processes and controls input signal traffic from input units of the MFP. In addition, the input device management unit 201 determines a changing order of another input device. Further, the input device management unit 201 includes an input device control unit 201a, which is configured to control the input devices 101 through 105 illustrated in FIG. 2.

An input signal transmitted from the input device via each interface for the input device is data externally input to the MFP, such as a scan image signal obtained by scanning or PDL data from the network. In addition, the input signal includes a signal processed within the MFP, such as a signal for reprinting the image data that has been stored in the document management unit 111 and a signal for a cooperation operation with the RIP unit 108 and the output image processing unit 109.

The input job control unit 202 includes a protocol interpretation unit 202a and a job generation unit 202b. A request for executing a series of operations, which is transmitted from the input device management unit 201, is an instruction signal (a command or a protocol). The protocol interpretation unit 202a interprets the general description of the operation request and converts the protocol into operation instructions that can be recognized within the MFP.

On the other hand, the job generation unit 202b generates various types of jobs, such as a print job, a scan job, a PDL rasterization job, or a FAX receiving job. In the generated job, a scenario file including information about processing which the job is subjected to within the MFP and destination which the processed job is sent to is defined. The job is processed within the MFP according to the flow defined by the scenario file.

The output job control unit 203 includes a job analysis unit 203a, a binder analysis unit 203b, a document analysis unit 204c, and a page analysis unit 205d. The output job control unit 203 is configured to generate job setting information (generally referred to as a "job ticket") and image information for the job.

The job analysis unit 203a analyzes setting information about the entire job in detail, such as the name of the document to be printed, the number of prints, a designation of a paper discharge tray that is the output destination, and the order of a plurality of binders included in a job. The binder analysis unit 203b analyzes the setting information about the entire binder in detail, such as the setting of the binding method, the stapling position(s), and the order of documents of the binder constituted by a plurality of documents.

The document analysis unit 203c analyzes the setting information about the entire document in detail, such as the order of pages of the document including a plurality of pages, the designation of two-sided printing, and the type of the cover and a slip sheet to be added or inserted. The page analysis unit 204d analyzes the setting information about the entire setting pages of various types, such as the resolution of the image or the orientation of the image (landscape or portrait). In addition, if PDL data is input, the page analysis unit 204d calls the RIP unit 108 and executes rasterization on the data by using the RIP unit 108.

In generating image information, page image information is generated by the rasterization executed by the RIP unit 108. The page image information is compressed by the compression/decompression unit 110 before being stored in the document management unit 111 in association with the setting information.

The output device management unit 204 is constituted by a device assignment unit 204a and an output device control unit 204b. The image information stored in the document management unit 111 is then decompressed by the compression/decompression unit 110. Furthermore, the image information is read together with the setting information associated with the image information. Furthermore, the setting information and the image information are transmitted to 204 as a pair of pieces of information.

In assigning an output device according to the scenario of each job that has been defined, a device conflict may arise if a plurality of jobs is simultaneously processed. The device assignment unit 204a arbitrates the device conflict. The output device control unit 204b executes scheduling of a device to be utilized (the printer unit 113 and the post-processing unit 114).

Figure 4:
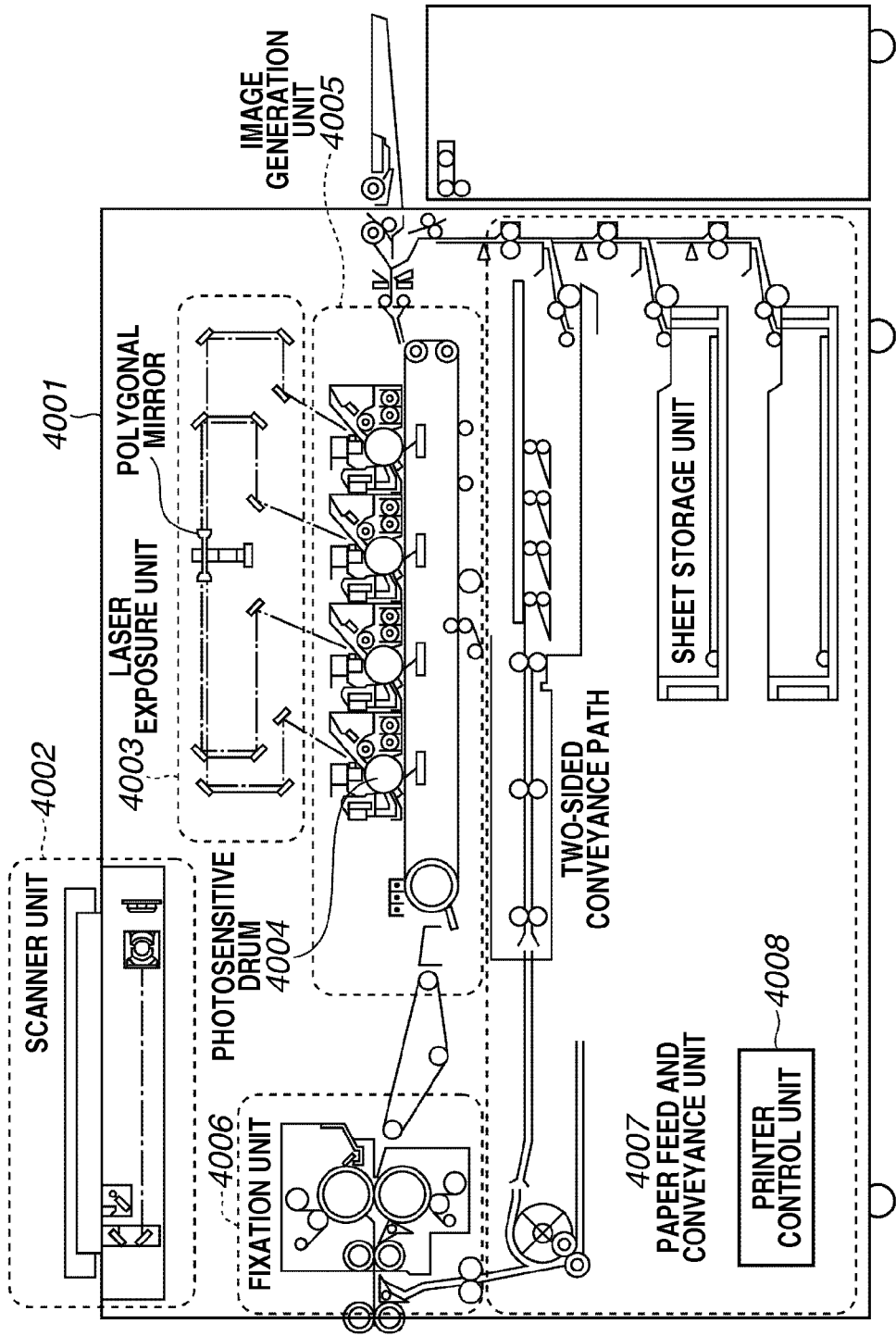
FIG. 4 is a cross section of a four-drum (4D) color system MFP illustrating an exemplary configuration thereof.

An exemplary configuration of a 4D color system MFP 4001, which is an example of the printer unit 113, will be described in detail below with reference to FIG. 4. FIG. 4 is a cross section of the 4D color system MFP illustrating an exemplary configuration thereof.

Referring to FIG. 4, the 4D color system MFP 4001 includes a scanner unit 4002, a laser exposure unit 4003, a photosensitive drum 4004, an image forming unit 4005, a fixing unit 4006, a paper feeding/conveyance unit 4007, and a printer control unit 4008, which is configured to control an operation of the above-described units included in the 4D color system MFP 4001.

The scanner unit 4002 irradiates the document set on the document stand with light to optically read an image of the document. The scanner unit 4002 converts the read document image into an electric signal to form image data.

The laser exposure unit 4003 irradiates the photosensitive drum 4004 with light incident upon a rotational polygon mirror, which rotates at a uniform angular velocity, with a ray, such as a laser beam modulated according to the image data, and reflects the scanning light.

The image forming unit 4005 rotationally drives the photosensitive drum 4004. In addition, the image forming unit 4005 charges the photosensitive drum 4004 by using an electric charger. Furthermore, the image forming unit 4005 develops latent images formed by the laser exposure unit 4003 on the photosensitive drum 4004 with toners.

The image forming unit 4005 transfers the toner images onto the sheet. Furthermore, the image forming unit 4005 collects minute toners that have not been transferred onto the sheet and are remaining on the photosensitive drum 4004. The series of process is implemented by four development units (development stations).

The four development units are arranged in order of a cyan (C) development unit, a magenta (M) development unit, a yellow (Y) development unit, and a black (K) development unit. After predetermined time has elapsed since the start of image forming by the cyan station, operations for forming M, Y, and K images are serially executed. By executing the above-described timing control, a full color toner image is transferred on the sheet without color misregistration.

The fixing unit 4006 is constituted by combinations of rollers and belts. Furthermore, the fixing unit 4006 includes a heat source, such as a halogen heater. The fixing unit 4006 applies heat and pressure to the toner on the sheet on which the toner images have been transferred by the image forming unit to thermally fuse and fix the toners with the heat and pressure.

The paper feeding/conveyance unit 4007 includes at least one sheet storage unit, such as a sheet cassette or a paper deck. The sheet storage unit is a paper storage unit configured to store paper, which is a paper feed source. The paper feeding/conveyance unit 4007 separates one sheet from among a plurality of sheets stored in the sheet storage unit according to an instruction from the printer control unit 4008. The paper feeding/conveyance unit 4007 conveys the separated sheet to the image forming unit and the fixing unit.

The paper feeding/conveyance unit 4007 is configured to convey the sheet and transfer toner image of the four colors in the development stations of four colors. As a result, a full color toner image is formed on the sheet. In addition, in forming an image on both surfaces of the sheet, the paper feeding/conveyance unit 4007 executes control for conveying the sheet that has passed the fixing unit to go through a conveyance path for conveying the sheet to the image forming unit again.

The printer control unit 4008 communicates with the MFP control unit 106, which controls the operation of the entire MFP, to control the printing. In addition, the printer control unit 4008 gives an instruction for smoothly executing the entire operation in appropriate coordination while managing the state of the scanner, the laser exposure unit, the image forming unit, the fixing unit, and the paper feeding/conveyance unit described above.

After exiting from the fixing unit 4006, the sheet is conveyed to an image reading sensor unit, which is provided on the paper conveyance path. The image reading sensor unit reads the printed image data. The read image data is used for an inspection by measuring the density of the output image and determining whether any abnormality has occurred to the output image.

Figure 5:
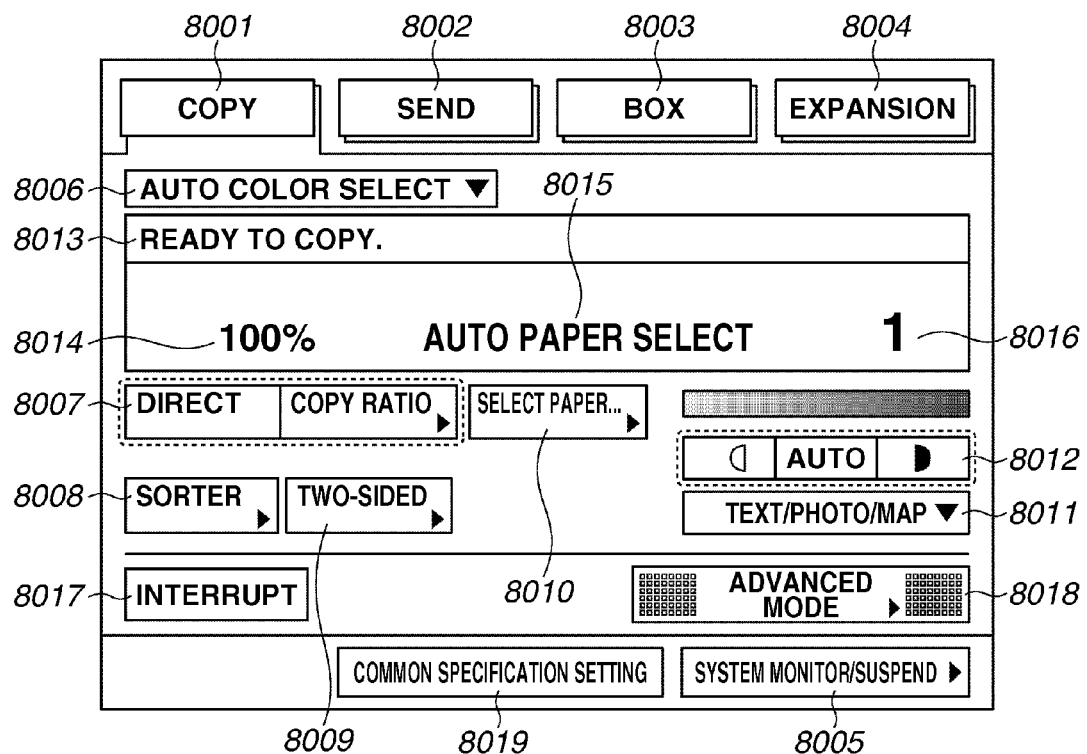
FIG. 5 illustrates an example of an initial screen in a standby mode, which is displayed on a liquid crystal display (LCD) of an operation unit of the MFP.

Now, a screen displayed on the LCD of the operation unit 107 of the MFP 100 will be described in detail below. FIG. 5 illustrates an example of an initial screen in a standby mode, which is displayed on the LCD of the operation unit 107 of the MFP 100.

Referring to FIG. 5, a copy tab 8001 is a tab key that can be operated to shift to an operation screen for a copy operation. A send tab 8002 is a tab key that can be operated to instruct a send operation, such as a FAX send operation or an e-mail send operation.

A box tab 8003 is a tab key that can be operated to shift to a screen for inputting and outputting a job to and from a box, which is an area for storing a job. An option tab 804 is a tab key that can be operated to set an expansion function, such as paper setting information and a scanner setting. A system monitor key 8005 is a key for displaying a state of the MFP and operation status information about the MFP.

A color selection setting key 8006 is a key for selecting a color mode, such as "color copy", "monochromatic copy", and "auto select". A copy ratio setting key 8007 is a key for shifting to a screen for executing a magnification setting, such as "direct", "enlarge", and "reduce".

A post-processing setting key 8008 is a key for shifting to a screen for setting whether to execute stapling and punching, the number of staples and holes to be punched, and the position(s) of stapling and punching. A two-sided setting key 8009 is a key for shifting to a screen for selecting between one-sided printing and two-sided printing.

A paper size setting key 8010 is key for shifting to a screen for selecting the paper feed stage, the paper size, and the medium type. An image mode setting key 8011 is a key for selecting an image mode appropriate for the document image, such as a text mode and a photograph mode.

A density setting key 8012 is a key for adjusting (increasing or reducing) the density of the output image. A status display field 8013 is a display field that displays simple status information, such as "standing by . . . ", "warm-up in process . . . ", "jamming detected", or "error detected".

A magnification display field 8014 displays a magnification set by the user operating a magnification setting key. A paper size display field 8015 displays the paper size and the paper size selection mode set by operating paper size setting keys. A print quantity display field 8016 displays the number of prints designated by operating numeral keys and the page number of the currently printed page while printing is in process.

An interruption key 8017 can be operated when a current copy operation is to be interrupted with another job. An advanced mode key 8018 can be operated to shift to a screen for executing a setting to various image processing and layout settings, such as continuous copy of pages, a cover/slip sheet setting, a reduction layout, and image moving processing.

Figure 6:
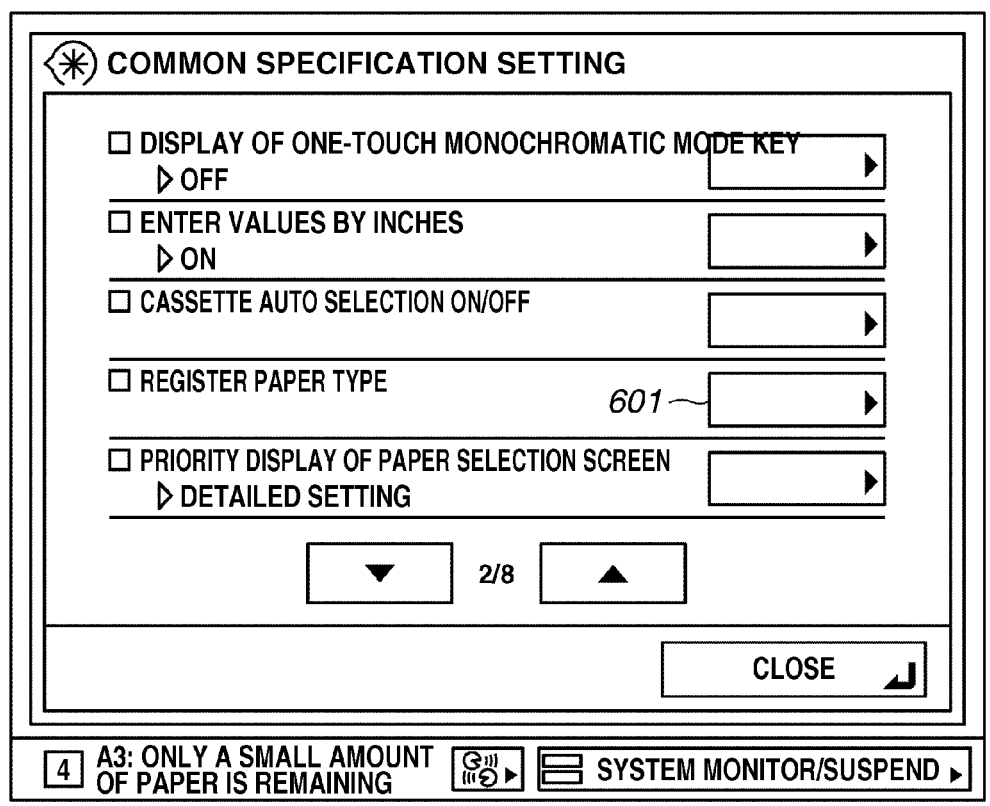
FIG. 6 illustrates an example of a common specification setting screen, which is displayed on the LCD of the operation unit.

A common specification setting key 8019 can be pressed (touched) to shift the screen displayed on the LCD of the operation unit 107 to a common specification setting screen illustrated in FIG. 6. Instead of the common specification setting key (soft key) 8019 illustrated in FIG. 5, a hard key can be provided on the operation unit 107. Further alternatively, a plurality of screens can be displayed before shifting to the common specification setting screen 8019.

A function for displaying the paper type registered in the MFP 100 will be described in detail below with reference to FIGS. 6 and 7. FIG. 6 illustrates an example of the common specification setting screen, which is displayed on the LCD of the operation unit 107.

Figure 7:
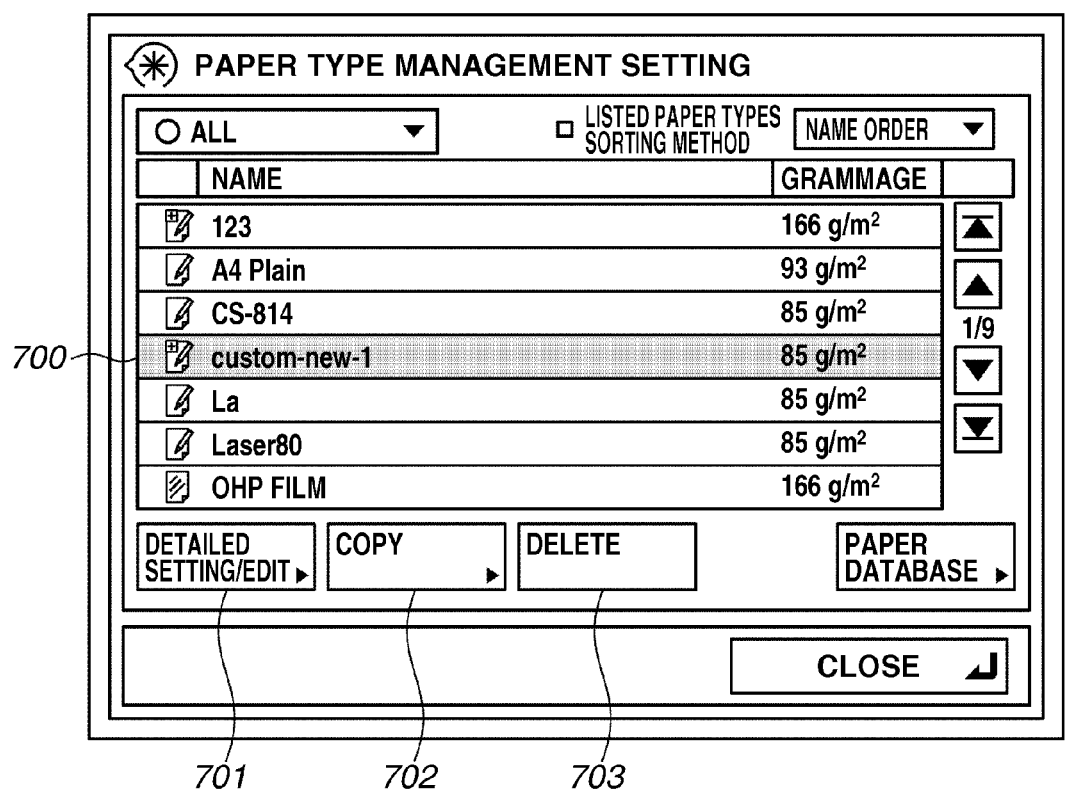
FIG. 7 illustrates an example of a paper type management setting screen, which is displayed on the LCD of the operation unit.

Referring to FIG. 6, when the user selects a paper type registration key 601 via the common specification setting screen (i.e., when the user touches the common specification setting screen on the paper type registration key 601), the screen displayed on the LCD of the operation unit 107 is shifted to a paper type management setting screen illustrated in FIG. 7.

The LCD of the operation unit 107 displays a list of paper type information registered in the MFP 100 (i.e., the paper information database included in the resource management unit 112) on the paper type management setting screen illustrated in FIG. 7.

FIG. 7 illustrates an example of the paper type management setting screen displayed on the LCD of the operation unit 107. When the user selects a copy button 702 via the paper type management setting screen illustrated in FIG. 7 (i.e., when the user touches the paper type management setting screen on the copy button 702), the user can register a type of paper currently selected from among those listed in a standard paper type list 700 via the screen displayed on the LCD of the operation unit 107 by a different paper type name.

When the user selects (touches the screen on) a delete button 703, the user can delete the registered paper type, which is currently selected from among those included in the standard paper type list 700 via the LCD of the operation unit 107. When the user selects (touches the screen on) a detailed setting/edit button 701, the display on the LCD of the operation unit 107 is shifted to a paper type detailed setting/editing screen illustrated in FIG. 8 to display detailed information about the paper type that is currently selected from among those included in the standard paper type list 700.

The paper type detailed setting/editing screen illustrated in FIG. 8 is displayed also when the copy button 702 is selected. The paper type detailed setting/editing screen will be described in detail below.

FIG. 8 illustrates an example of the detailed setting/editing screen, which is displayed on the LCD of the operation unit 107.

The paper type detailed setting/editing screen illustrated in FIG. 8 displays paper type detailed information. The paper type detailed information includes paper attribute information, such as the grammage, the surface smoothness, the characteristic (shape), a curl correction amount, and an adjustment amount of air blow from a paper separation fun of the paper.

The user can arbitrarily change each registered content (the content of the setting) by selecting a change button 801, which is illustrated in FIG. 8 in the right portion thereof. The grammage refers to a mass per unitary area of the sheet. The paper type is constituted by paper basic information, which is illustrated in FIG. 9, and printer dependency information, which is illustrated in FIG. 10.

FIG. 9 illustrates an example of paper basic information. FIG. 10 illustrates an example of printer dependency information.

Referring to FIG. 9, the basic information includes three elements, i.e., a characteristic (shape) 901, a surface smoothness 902, and a grammage 903.

Referring to FIG. 10, the printer dependency information includes various adjustment values, such as the curl correction amount and the adjustment amount of air blow from the paper separation fun. The adjustment value of the printer dependency information may be different for different MFP as to the sheet having the same basic information.

For the classification of the paper type, two types of sheets are used, which includes basic paper, which is supported by each MFP as standard, and user-set paper, which can be generated by the user copying the information about already registered paper. For a method for generating the user-set paper, a method for editing each item after copying the information about the basic paper and a method for changing each item after copying the information about other user-set paper can be used.

In the following description, an exemplary method for generating the user-set paper will be described in detail.

To begin with, the user selects basic paper from among those included in the standard paper type list 700 (FIG. 7), which becomes the reference. Subsequently, by selecting the copy button 702, the user inputs a paper name to be newly registered (for example, "custom-new-1"). Then the screen illustrated in FIG. 8 is displayed.

The user can arbitrarily set detailed parameters of the paper, such as the name, the grammage, the surface smoothness, and the characteristic (shape) of the paper via the displayed screen illustrated in FIG. 8. By executing a desired setting and selecting a "close" button 802, the user can newly register a user-set paper in the paper information database, which is included in the resource management unit 112.

At this time, the basic information illustrated in FIG. 9 and the printer dependency information illustrated in FIG. 10 are written on the registered user-set paper. The information illustrated in FIGS. 9 and 10 is information to be stored in the resource management unit 112 of the MFP and displayed on the operation unit 107 of the MFP.

On the other hand, the print processing apparatus 400 also includes functions for displaying, editing, copying and deleting the paper type registered in the print processing apparatus 400 (i.e., the paper information database stored in the internal HD 404). As illustrated in FIG. 11, the print processing apparatus 400 includes a function for importing and exporting the paper type to share the paper type with other print processing apparatuses (not illustrated).

The function for displaying, deleting, copying, editing, and importing and exporting the paper type stored in the print processing apparatus 400 to share the paper type with other print processing apparatuses will be described in detail below with reference to FIG. 11. FIG. 11 illustrates an example of a paper type management setting screen displayed on the print processing apparatus 400.

The print processing apparatus 400 includes a function of a hypertext transport protocol (HTTP) server. The screen illustrated in FIG. 11 is displayed on a web browser of the host computer 300 by accessing the HTTP server from the web browser. To paraphrase this, the screen illustrated in FIG. 11 is displayed on the display unit of the host computer 300.

When the user selects a delete button 1101, the user can delete the paper type currently selected from among those included in a list 1100 from the print processing apparatus 400. A copy button 1102 can be selected to register the currently selected paper type in the print processing apparatus 400 by a different name.

A paper editing button 1103 can be selected to edit paper attribute information, such as the grammage, the surface smoothness, the characteristic (shape), the curl correction amount, and the adjustment amount of air blow from the paper separation fun of the paper. An export button 1105 can be operated to archive all the paper types currently registered in the print processing apparatus 400. The archived paper type can be exported to other print processing apparatuses.

An import button 1104 can be operated to add the archived paper type registered in another print processing apparatus to the currently registered paper type.

An exemplary method for newly setting a paper type to a print job from a general printer driver installed to the print processing apparatus 400 will be described in detail below with reference to FIGS. 12 and 13.

Figure 12:
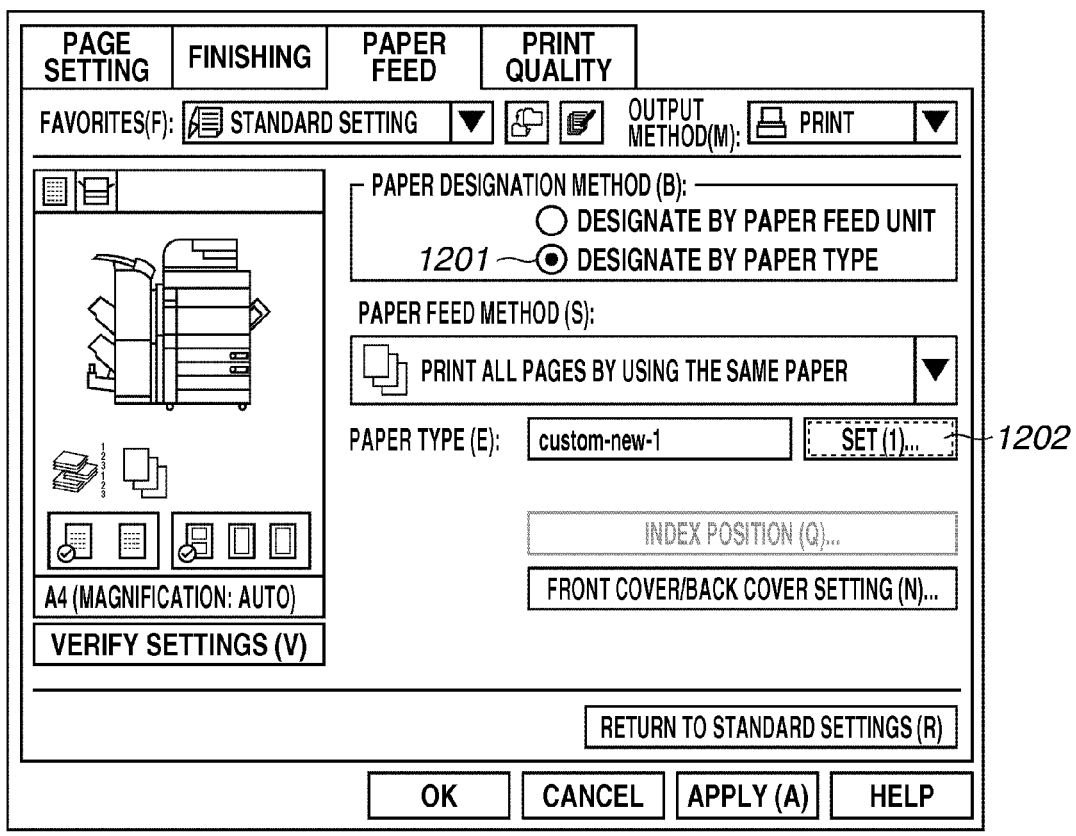
FIG. 12 illustrates an example of a screen displayed by a printer driver of the print processing apparatus.

FIG. 12 illustrates an exemplary screen displayed by the printer driver of the print processing apparatus 400. The screen illustrated in FIG. 12 is displayed on the display unit of the host computer 300, to which the printer driver of the print processing apparatus 400 has been installed.

Referring to FIG. 12, the user designates "designate by paper type" 1201 as the paper designation method by operating a pointing device of the host computer 300. In addition, by using the pointing device of the host computer 300, the user can select a "set" button 1202. Then a paper type setting screen illustrated in FIG. 13 is displayed on the display unit of the host computer 300.

FIG. 13 illustrates an example of a paper type setting screen. Via the paper type setting screen illustrated in FIG. 13, the user can select the above-described basic paper and the user-set paper. In addition, when the user selects a "generate new paper" button 1300, a new paper generation screen illustrated in FIG. 14 is displayed on the display unit of the host computer 300.

Figure 14:
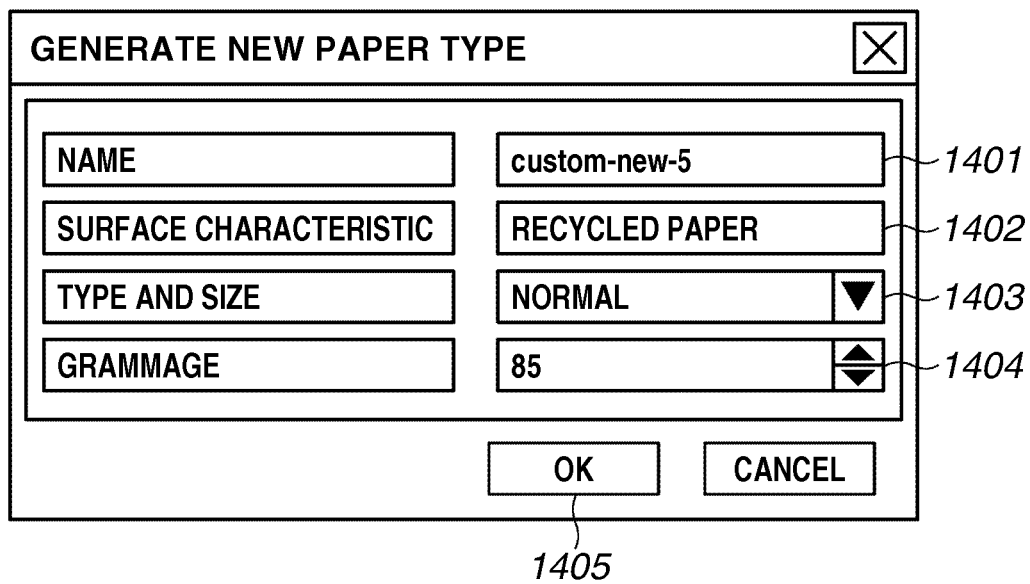
FIG. 14 illustrates an example of a new paper generation screen.

FIG. 14 illustrates an example of a new paper generation screen. The user can generate a new paper type by inputting a name 1401, a characteristic (shape) 1403, and a grammage 1404 of the type of paper to be newly generated and by pressing an OK button 1405. The information about the newly generated paper type is stored in an external storage device, such as a hard disk or a solid state drive (SSD), of the host computer 300 as setting information for the printer driver.

When the user inputs an instruction for executing the job on the host computer 300, the CPU of the host computer 300 transmits the print job to the print processing apparatus 400 from the printer driver after adding the newly generated paper type to the print job. The print processing apparatus 400 registers the information about the newly generated paper type, which has been added to the print job, in the paper information database stored in the internal HD 404.

FIG. 15 illustrates an example of a paper information database, which manages the paper type and which is stored in the print processing apparatus 400 and the MFP control unit 106 of the MFP 100.

Referring to FIG. 15, the print processing apparatus 400 includes a paper information database (a first paper information database) 1501, which is stored in the internal HD 404 of the print processing apparatus 400. Furthermore, the MFP control unit 106 includes a paper information database (a second paper information database) 1502, which is stored in the resource management unit 112 of the MFP 100.

Basically, both the paper information databases (the paper information database 1501 of the print processing apparatus 400 and the paper information database 1502 of the MFP control unit 106) should have the same items. However, not all the items thereof may not be the same because the systems are different from each other.

In addition, the paper information databases 1501 and 1502 should be synchronized with each other. However, the paper information databases 1501 and 1502 may not be always synchronized with each other, as in the case where the user newly sets a paper type to the print job by using the printer driver that transmits the print job to the print processing apparatus 400 as described above.

Furthermore, not all MFPs 100 may always include the operation unit 107. However, in both the paper information databases 1501 and 1502, printer dependency information 1501*a* and 1502 are always required in executing control to perform actual printing by using the printer unit 113 of the MFP 100.

For example, unless an appropriate value is set to the curl correction amount included in the printer dependency information, the sheet may be warped after going through the fixing unit of the MFP 100. As a result, a paper jam may occur in a post-processing apparatus (not illustrated).

If no post-processing apparatus is connected, an intense curl may arise on an output sheet. As a result, the quality of an output product output in this case may not be sufficiently high. Similarly, unless an appropriate value is set to the adjustment amount of air blow from the paper separation fun, which is included in the printer dependency information, a double feed of sheets or a paper jam in feeding the paper may arise in a paper feed unit that employs an air-assistance mechanism.

In order to prevent the above-described problem, it is necessary to set an appropriate value included in the printer dependency information and transmit the printer dependency information including the appropriate value to the printer unit 113.

A method executed by the print processing apparatus 400 for receiving a print job that includes a paper type not included in the paper information database and for normally completing the printing will be described in detail below with reference to the flow chart of FIG. 16. FIG. 16 is a flow chart illustrating an exemplary flow of processing from receiving of print data to printing of the print data, which is executed by the print processing apparatus 400.

The processing in the flow chart of FIG. 16 can be implemented by the CPU 401 of the print processing apparatus 400 by loading and executing a computer-executable program from the ROM 402 or the internal HD 404.

Referring to FIG. 16, in step S101, the CPU 401 of the print processing apparatus 400 receives print data from the host computer 300, which is connected to the network. Then the processing advances to step S102. In step S102, the CPU 401 generates print attribute information about the print job to be transmitted to the MFP 100 by analyzing the print data received in step S101.

The print attribute information is information about the paper feed source, the paper type, the paper size, the setting of the color mode (color/monochromatic), the paper discharge destination, and post-processing options, such as stapling and punching. In addition, the CPU 401 serially analyzes the received print data to generate the image data starting from a first page.

In step S103, the CPU 401 generates image data of the print job by rasterizing the print data analyzed in step S102. In step S104, the CPU 401 determines whether the type of paper generated based on the print job analyzed in step S102 is a new paper type (or whether the type of paper generated based on the print job analyzed in step S102 has been registered in the paper information database 1501 stored in the print processing apparatus 400) (first determination processing).

If it is determined that the paper type generated based on the print job is a new paper type (Yes in step S104), then the processing advances to step S105. In step S105, the CPU 401 selects a paper type having a most similar paper type from among those that have been already registered, based on the grammage and the surface smoothness of the paper etc. (i.e., searches for a similar paper type). The processing in step S105 (registered paper type selection processing) will be described in detail below with reference to FIG. 18.

In step S106, the CPU 401 copies the printer dependency information about the paper type selected in step S105 into the printer dependency information about the generated paper type as illustrated in FIG. 17.

FIG. 17 illustrates an exemplary operation for copying printer dependency information about the basic paper onto user-set paper. Referring to FIG. 17, by copying the printer dependency information about the basic paper to the user-set paper, information about the newly set paper type, which includes both the basic information and the printer dependency information, can be prepared.

In step S107, the CPU 401 transmits the paper type information to which the printer dependency information has been copied in step S106 to the MFP 100 and instructs the MFP 100 to register the transmitted information in the paper information database 1502 of the MFP 100. Then the processing advances to step S108.

The MFP 100 registers the paper type information received from the print processing apparatus 400 in the paper information database 1502 of the MFP 100 as instructed. In the above-described manner, the new paper type is registered in both paper information databases (the paper information database 1501 of the print processing apparatus 400 and the paper information database 1502 of the MFP control unit 106).

In step S107, the CPU 401 also executes processing for registering the paper type information, to which the printer dependency information has been copied in step S106, in the paper information database 1501 of the print processing apparatus 400.

On the other hand, if it is determined that the generated paper type is an existing paper type (that the generated paper type is not new) (No in step S104), then the processing advances to step S108. In step S108, the CPU 401 acquires a job processing status of the MFP 100 from the MFP 100 before transmitting the image data generated in step S103 and the print attribute information generated in step S102 to the MFP 100.

The job processing status of the MFP 100 corresponds to information about a print job that is currently printed by the MFP 100 or that is currently waiting to be printed. For example, the job processing status of the MFP 100 corresponds to a print job status of the MFP control unit, which is illustrated in FIG. 19.

More specifically, in step S108, the CPU 401 of the print processing apparatus 400 transmits a request for acquiring a job processing status to the MFP 100. Then the MFP 100 transmits, to the print processing apparatus 400 (i.e., notifies the print processing apparatus 400 of), the job processing status of the MFP 100 according to the request from the print processing apparatus 400.

In step S109, the CPU 401 determines whether any print job that has been transmitted to the MFP 100 and which is waiting to be printed or any currently printed print job exists according to the job processing status acquired in step S108. To paraphrase this, the CPU 401 determines whether any print job waiting to be printed exists in the MFP 100 or whether any print job is currently printed on the MFP 100.

If it is determined that any print job which is currently waiting to be printed exists or that any print job currently printed by the MFP 100 exists (Yes in step S109), then the processing advances to step S110. In step S110, the CPU 401 verifies paper feed source information about the print job, which is stored in the MFP 100, according to the job status information of the MFP acquired in step S108.

In step S111, the CPU 401 determines whether the paper storage unit (for example, a paper feed cassette) that is the paper feed source of the print job to be transmitted is currently available. More specifically, in the determination in step S111, if any print job whose paper storage unit of the MFP 100, which has been designated as the paper feed source, is the same as the paper storage unit designated in the print job to be transmitted to the MFP 100 exists in print jobs currently printed on the MFP 100 or print jobs currently waiting to be printed, then it is determined that no currently available paper feed source exists (No in step S111).

On the other hand, in the determination in step S111, if no print job whose paper storage unit of the MFP 100, which has been designated as the paper feed source, is the same as the paper storage unit designated in the print job to be transmitted to the MFP 100 exists in print jobs currently printed on the MFP 100 or print jobs currently waiting to be printed, then it is determined that a currently available paper feed source exists (Yes in step S111).

If any available paper feed source exists and if the sheet exists in the paper storage unit of the MFP 100, which is the paper feed source designated in the print job to be transmitted to the MFP 100, the sheet can be exchanged. On the other hand, if it is determined that no sheet exists in the paper storage unit of the MFP 100, and then a paper replenishment request can be input.

If the paper feed source designated in the print job to be transmitted to the MFP 100 is not available (No in step S111), then the processing returns to step S108. In this case, the CPU 401 repeats the processing in steps S108 through S111 until the paper feed source designated in the print job to be transmitted to the MFP 100 becomes available.

On the other hand, if it is determined that the paper feed source designated in the print job to be transmitted to the MFP 100 is available (Yes in step S111), then the processing advances to step S112. Furthermore, if it is determined that no print job that has been transmitted to the MFP 100 and which is waiting to be printed or no currently printed print job exists (No in step S109), then the processing advances to step S112.

In other words, in steps S109 through S111 described above, the CPU 401 determines whether any print job whose paper storage unit of the MFP 100, which has been designated as the paper feed source of the print job, is the same as the paper storage unit of the MFP 100 designated in the print job to be transmitted to the MFP 100 exists in print jobs currently printed on the MFP 100 or currently waiting to be printed, according to the information acquired from the MFP 100 (second determination processing).

If it is determined that no print job whose paper storage unit of the MFP 100, which has been designated as the paper feed source of the print job, is the same as the paper storage unit of the MFP 100 designated in the print job to be transmitted to the MFP 100 exists in print jobs currently printed on the MFP 100 or currently waiting to be printed, according to the information acquired from the MFP 100 (No in step S111), then the processing advances to step S112.

In step S112, the CPU 401 makes a request for setting the sheet to the user. More specifically, in step S112, the CPU 401 transmits, to the MFP 100, a message that prompts the user to set the sheet of the paper type designated in the print job to the paper storage unit that is designated by the paper feed information included in the print job transmitted to the MFP 100 and instructs the MFP 100 to display the transmitted message.

For example, a message "Please set A4-size "custom-new-5" to the "cassette 2." is transmitted to the MFP 100 to instruct the MFP 100 to display the message. The MFP 100 displays the above-described message on the LCD of the operation unit 107.

Alternatively, the above-described message is transmitted to the host computer 300 to instruct the host computer 300 that is a transmission source of the print job and the host computer 300 can display the message on its display unit. Further alternatively, the above-described message can be transmitted to both the MFP 100 and the host computer 300 to display the message on the display unit of both apparatuses.

After making the paper setting request to the user in step S112, the processing advances to step S113. In step S113, the CPU 401 inputs an inquiry to the MFP 100 to determine whether the user has set the requested paper to the paper feed source (the paper storage unit) (third determination processing).

For example, the CPU 401 inputs an inquiry as to whether the MFP 100 has detected that the designated paper storage unit has been opened and closed after the paper setting request is given in step S112 and that the sheet is currently stored in the paper storage unit. When it is detected that the paper storage unit has been opened and closed and that the sheet has been set to the paper storage unit, the MFP 100 notifies information indicating the above-described state to the print processing apparatus 400.

When the notification is received, the CPU 401 determines that the user has set the requested paper to the paper feed source. The CPU 401 repeats the processing in step S113 until it is determined that the user has set the requested paper to the paper feed source.

If it is determined that the user has set the requested paper to the paper feed source (Yes in step S113), then the processing advances to step S114. In step S114, the CPU 401 transmits, to the MFP 100 (notifies the MFP 100 of), paper feed source information and paper type information, which is included in the print attribute information in the print job to be transmitted to the MFP 100.

In step S115, the CPU 401 transmits the other print attribute information included in the print job to be transmitted to the MFP 100 and the image data included in the print job, to the MFP 100. The image data transmitted to the MFP 100 is printed by the MFP 100.

In the above-described manner, the present exemplary embodiment executes the processing from receiving of the print data by the print processing apparatus 400 from the host computer 300 to printing of the received print data by the MFP 100.

The registered paper type selection processing, which is executed in step S105 of the flow chart of FIG. 16, will be described in detail below with reference to the flow chart of FIG. 18. The registered paper type selection processing is processing for selecting a registered paper type from among those stored in the paper information database of the print processing apparatus 400.

Figure 18:
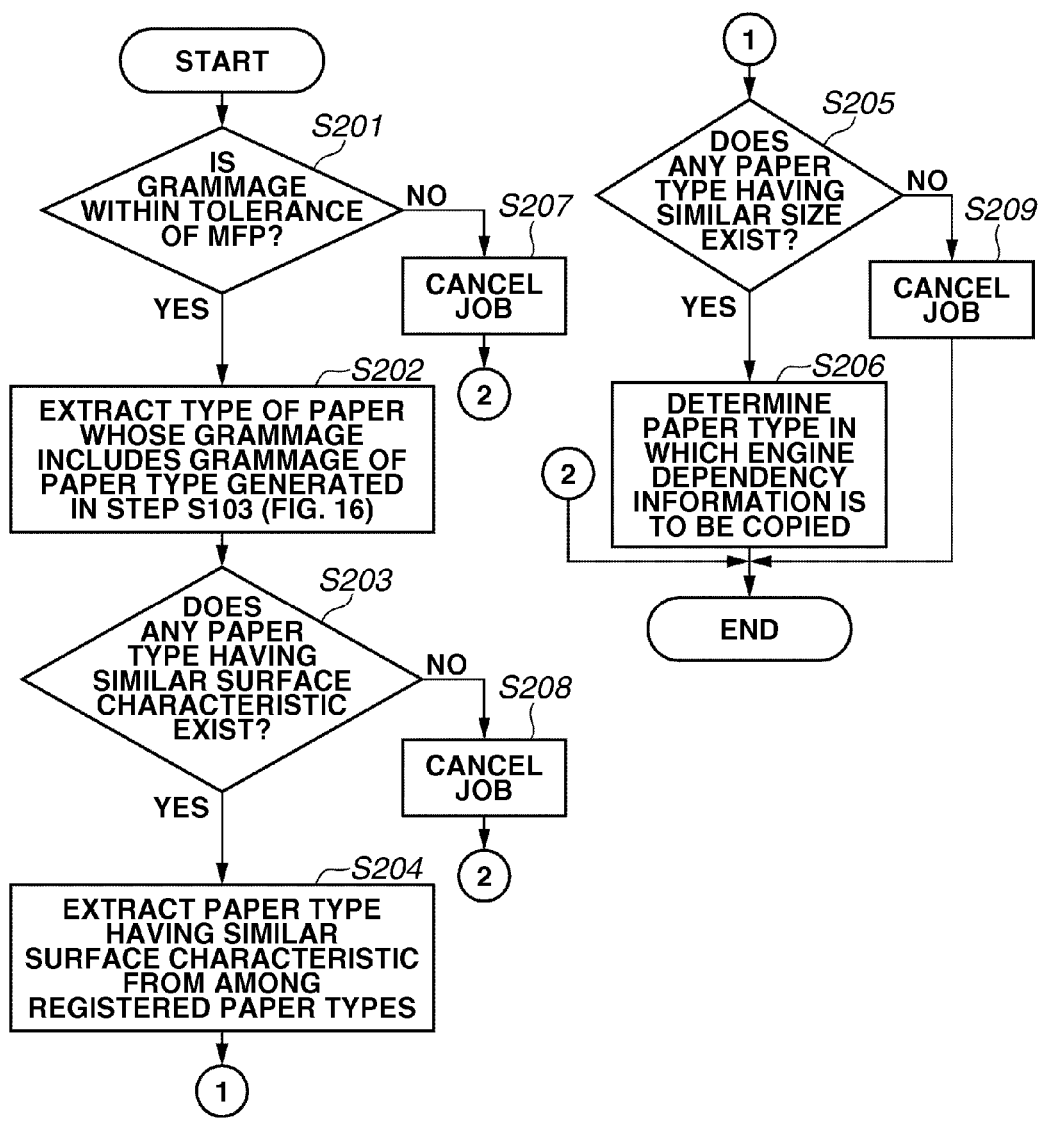
FIG. 18 is a flowchart illustrating an exemplary flow of processing for selecting a registered paper type, which is executed in step S105 in the flow chart of FIG. 16.

FIG. 18 is a flow chart illustrating an exemplary flow of processing for selecting a registered paper type, which is executed in step S105 in the flow chart of FIG. 16. The processing in the flow chart of FIG. 18 is implemented by the CPU 401 of the print processing apparatus 400 loading and executing a computer-executable program from the ROM 402 or the internal HD 404.

In the present exemplary embodiment, the processing in the flow chart of FIG. 18 is executed based on software. However, alternatively, apart of the processing can be executed by hardware.

Referring to FIG. 18, in step S201, the CPU 401 determines whether the grammage of the paper type that has been determined as a new paper type in step S104 (FIG. 16) (hereinafter simply referred to as a "new paper type") has a value within the tolerance of the MFP 100. Information about the tolerance of the MFP 100 can be acquired by inputting a request for the information to the MFP 100 at the timing of step S201. Alternatively, the information about the tolerance of the MFP 100 can be previously acquired from the MFP 100 (or can be previously set by the system administrator from the host computer 300) and stored in the internal HD 404.

If it is determined that the grammage of the new paper type is out of the tolerance of the MFP 100 (No in step S201), then the processing advances to step S207. In step S207, the CPU 401 cancels the print job. On the other hand, if it is determined that the grammage of the new paper type is within the tolerance of the MFP 100 (Yes in step S201), then the processing advances to step S202.

In step S202, the CPU 401 extracts all the paper types having the range of grammage that includes the grammage of the paper type generated in step S103 of the flow chart of FIG. 16 from among the paper types that has been registered in the paper information database 1501.

In the example illustrated in FIG. 9, the range of the grammage of the already registered paper type is 52-63, 64-90, 91-105, 106-128, 129-150, 151-180, 181-220, 221-256, and 257-300 g/m$^2$. If the grammage of the new paper type is 77 g/m$^2$, for example, the CPU 401 extracts all the paper types whose grammage falls in the grammage range of 64-90 g/m$^2$.

In step S203, the CPU 401 determines whether any paper type whose surface smoothness matches the surface smoothness of the new paper type exists in the paper types extracted in step S202. If it is determined that no paper type whose surface smoothness matches the surface smoothness of the new paper type exists in the paper types extracted in step S202 (No in step S203), then the processing advances to step S208. In step S208, the CPU 401 cancels the print job.

On the other hand, if it is determined that a paper type whose surface smoothness matches the surface smoothness of the new paper type exists in the paper types extracted in step S202 (Yes in step S203), then the processing advances to step S204. In step S204, the CPU 401 extracts all the paper types having the matched surface smoothness.

In step S205, the CPU 401 determines whether any paper type whose shape matches the shape of the new paper type exists in the paper types extracted in step S204. If it is determined that no paper type whose shape matches the shape of the new paper type exists in the paper types extracted in step S204 (No in step S205), then the processing advances to step S209. In step S209, the CPU 401 cancels the print job.

On the other hand, if it is determined that a paper type whose shape matches the shape of the new paper type exists in the paper types extracted in step S204 (Yes in step S205), then the processing advances to step S206. In step S206, the CPU 401 determines any of the paper type that has been determined in step S205 as having the matched shape as the paper type that is the source in copying engine dependency information to the new paper type. Then the processing returns to the flow chart of FIG. 16.

By executing the above-described processing, the CPU 401 can determine the paper type that has been registered and which has the range of grammage, the surface smoothness, or the shape which matches that of the new paper type, as the paper type that is the source in copying the engine dependency information to the new paper type. Accordingly, the present exemplary embodiment can set appropriate engine dependency information to the new paper type according to the range of grammage, the surface smoothness, and the shape of the new paper type.

The flow of registered paper type selection processing illustrated in FIG. 18 will be specifically described below with reference to the flow chart of FIGS. 9, 10, and 17. As illustrated in FIG. 9, the basic information about the paper type is constituted by three elements including the grammage, the surface smoothness, and the shape. The paper type, such as a "normal paper" or a "thick paper", is defined for each MFP according to the value and the content of each element.

As illustrated in FIG. 17, for example, a recycled paper 1 is defined as having the grammage of "77 $g/m^2$", which falls in the grammage range of 64-90 $g/m^2$ in FIG. 9. In addition, the recycled paper 1 is defined as having the surface smoothness of "recycled paper" and the shape (characteristic) of "normal".

As illustrated in FIG. 10, for the printer dependency information about the paper type, a value of a mechanical control, which is necessary for the MFP in executing printing, such as the curl correction amount and the amount of air blow from the paper separation fan, is defined.

Furthermore, as illustrated in FIG. 17, the recycled paper 1 is defined as having the curl correction amount of "+1" and the amount of air blow from the paper separation fan of "low". In addition, as illustrated in FIG. 17, the paper type is classified into two categories including "basic paper", which the MFP supports as standards, and "user-set paper", which can be generated by the user.

The basic paper has the same information in the paper information database 1501, which is stored in the print processing apparatus 400, and the paper information database 1502, which is stored in the resource management unit 112, as illustrated in FIG. 15.

Suppose that the new paper type that is generated after analyzing the print data received from the host computer 300 is "custom-new-5" (the grammage: 85 $g/m^2$, the surface smoothness: "recycled paper", the shape (characteristic): none (normal)) as illustrated in FIG. 17. In this case, in the example illustrated in FIG. 9, in step S201, the CPU 401 determines whether the grammage is within the grammage range of "52-300 $g/m^2$".

In this case, the determination condition used in step S201 is satisfied because the grammage of the new paper type "custom-new-5" is 85 $g/m^2$ (Yes in step S201). In step S202, the CPU 401 extracts the types of paper whose grammage falls in the same range ("64-90 $g/m^2$"), i.e., "normal paper 1", "recycled paper 1", a "second art work", "bond paper", and "three-hole paper".

Subsequently, focusing on the fact that the new paper type "custom-new-5" has the surface smoothness of "recycled paper", it is determined that a type of paper whose surface smoothness is "recycled paper" exists in the basic paper narrowed down according to the grammage thereof (Yes in step S203). In step S204, the CPU 401 extracts the "recycled paper 1" only, whose surface smoothness is "recycled paper", form among the basic paper narrowed down according to the grammage.

Because the paper type has been narrowed down to one paper type "recycled paper 1", the CPU 401 can finally determine the paper type "recycled paper 1" as the paper type whose engine dependency information is to be copied to the portion of the new paper type including the engine dependency information at this timing.

Furthermore, if the character (shape) "normal" of the new paper type "custom-new-5" is focused, because the shape of the "recycled paper 1", which satisfies the conditions of the grammage and the surface smoothness, has the shape "normal" (Yes in step S205). Accordingly, the CPU 401 determines the "recycled paper 1" as the basic paper that is the source in copying the engine dependency information to the engine dependency information about the new paper type "custom-new-5".

As illustrated in FIG. 17, the CPU 401 finally determines the "custom-new-5" as the user-set paper by copying the engine dependency information about the "recycled paper 1" to the engine dependency information portion of the "custom-new-5". If the grammage of the new paper type is "85 g/m× m", the surface smoothness is "woodfree paper", and the shape (characteristic) is "none (normal)", the CPU 401 extracts the paper types "normal paper 1" and "three-hole paper". In this case, the "normal paper 1", whose shape (characteristic) is "none (normal)", is finally extracted.

More specifically, the CPU 401 extracts the information about the paper type designated in the print job to be transmitted and the information about the type of paper at least having the grammage falling in the same range as the range of the grammage of the paper type to be transmitted and having the same surface smoothness as the surface smoothness of the paper type to be transmitted as the information about the type of paper having similar basic information as the basic information about the type of paper designated in the print job.

Exemplary processing for making a paper setting request to the user, which is executed by the print processing apparatus 400 via the MFP 100, will be described in detail below with reference to FIG. 19. FIG. 19 illustrates an example of a print job processing state of the print processing apparatus 400 and the MFP control unit 106.

Referring to FIG. 19, the print processing apparatus 400 currently holds jobs 1 through 7, which includes the jobs 1 through 5, which have been already transmitted to the MFP 100, the job 6, which is waiting to be transmitted, and the job 7, which is waiting to be subjected to RIP. On the other hand, the MFP control unit 106 of the MFP 100 is currently printing the job 1, which has been received from the print processing apparatus 400. The MFP control unit 106 is enqueueing the jobs 2 through 5 for printing.

In the above-described state, the print processing apparatus 400 can transmit the job 6 that is waiting to be transmitted. However, in this case, the MFP control unit 106 makes the paper request to the user at the timing of executing printing by the MFP control unit 106. If the print processing apparatus 400 makes the paper setting request before transmitting the job considering the state of the MFP control unit 106, the user exchanges the sheet while the MFP control unit 106 executes the printing. Accordingly, the MFP control unit 106 does not suspend the printing operation.

To focus on the paper information and paper feed information in the print attribute information about the job 6, the job 6 has the paper information including the A4-size "custom-new-5" and the paper feed information "cassette 2". On the other hand, if it is determined that the job 2, which is waiting to be printed on the MFP control unit 106 has the paper information including the A3-size "thick paper 1" and the paper feed information "cassette 2".

If the paper exchange request for exchanging the sheet in the cassette 2 is notified to the user for the job 6 at this timing, the printing of the job 2 is not normally executed. Accordingly, the print processing apparatus 400 suspends the transmission of the job 6 to the MFP control unit 106 until the MFP control unit 106 completes the printing of the jobs 1 and 2.

Jobs 3 through 5, which are stored in the MFP control unit 106, have paper information and paper feed information different from those of the job 6. Accordingly, the print processing apparatus 400 can make a paper exchange request for the job 6 to the user when the printing of the job 2 is completed.

After it is verified that the user has actually set the paper necessary for the job 6 to the designated paper feed source (the cassette 2), the print processing apparatus 400 transmits the job 6 to the MFP 100.

If the print processing apparatus 400 adds the user-set paper according to the flow chart of FIG. 16, the capacity of the paper information database 1502 of the MFP 100 is fully consumed and the processing cannot continue. To paraphrase this, the capacity of both the paper information database 1501 of the print processing apparatus 400 and the paper information database 1502 of the MFP 100 stored in the resource management unit 112 is limited. If the MFP 100 does not include an operation unit, it becomes necessary to delete the information about the user-set paper from the print processing apparatus 400.

An exemplary method for deleting the information about the user-set paper from the print processing apparatus 400 will be described in detail below with reference to the flow chart of FIG. 20. In this case also, the user-set paper stored in the print processing apparatus 400 can be deleted by using the deletion function illustrated in FIG. 11.

An exemplary method for deleting the paper type information from the paper information database 1501 of the print processing apparatus 400 and the paper information database 1502 of the MFP 100 stored in the resource management unit 112 will be described in detail below with reference to the flow chart of FIG. 20.

Figure 20:
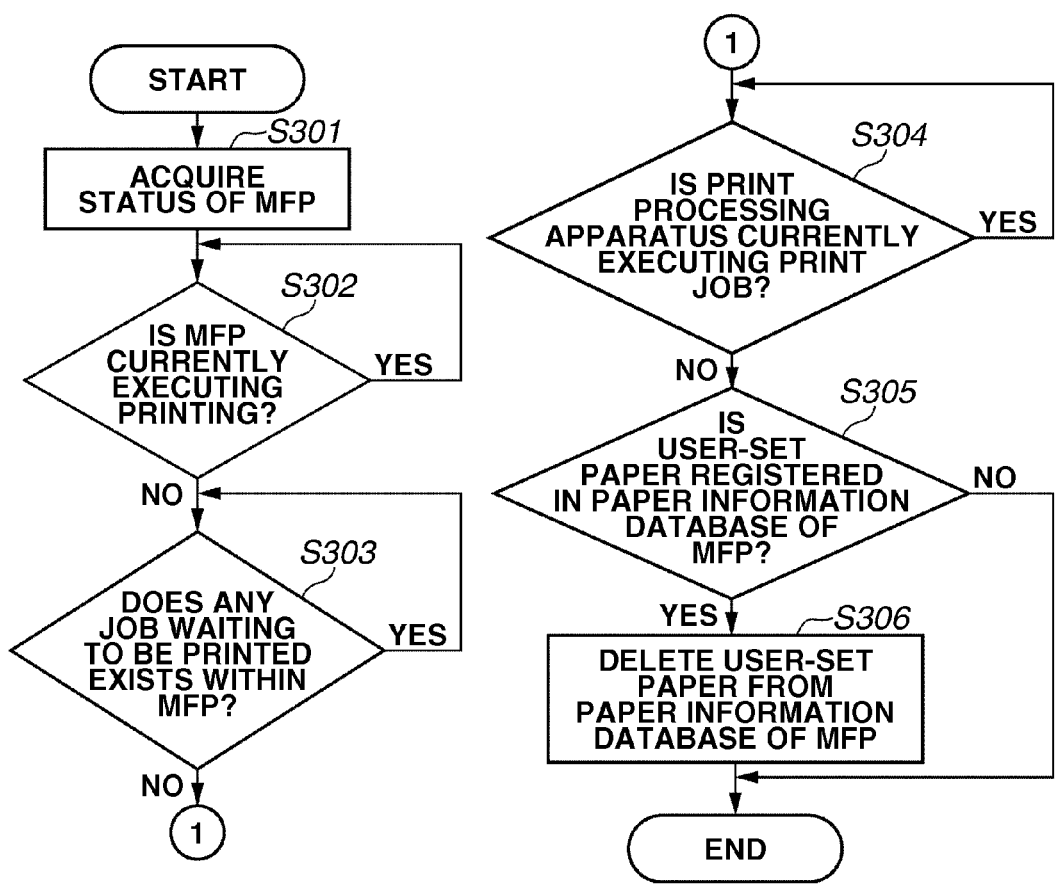
FIG. 20 is a flowchart illustrating an exemplary flow of processing for deleting paper type information, which has been registered in paper information databases of the print processing apparatus and the MFP in a resource management unit thereof.

FIG. 20 is a flow chart illustrating an exemplary flow of processing for deleting the paper type information, which has been registered in the paper information database 1501 of the print processing apparatus 400 and the paper information database 1502 of the MFP 100, which is stored in the resource management unit 112. The processing in the flow chart of FIG. 20 is implemented by the CPU 401 of the print processing apparatus 400 loading and executing a computer-executable program from the ROM 402 or the internal HD 404.

Referring to FIG. 20, in step S301, the CPU 401 of the print processing apparatus 400 acquires the status of the MFP 100 from the MFP control unit 106. The status of the MFP 100 includes information about whether the MFP control unit 106 is currently executing printing or whether the MFP control unit 106 is waiting to start printing.

In step S302, the CPU 401 determines whether the MFP control unit 106 is currently executing printing according to the status acquired in step S301. If it is determined that the MFP control unit 106 is currently executing printing (Yes in step S302), then the CPU 401 waits until the printing ends. On the other hand, if it is determined that the MFP control unit 106 is not currently executing printing (No in step S302), and then the processing advances to step S303.

In step S303, the CPU 401 determines whether any job waiting to be printed exists in the MFP control unit 106 according to the status acquired in step S301. If it is determined that a job waiting to be printed exists in the MFP control unit 106 (Yes in step S303), then the CPU 401 waits until printing of all jobs currently waiting to be printed is completed. On the other hand, if it is determined that no job waiting to be printed exists in the MFP control unit 106 (No in step S303), then the processing advances to step S304.

In step S304, the CPU 401 determines whether the print processing apparatus 400 is currently processing any print job. If it is determined that the print processing apparatus 400 is currently processing a print job (Yes in step S304), then the CPU 401 waits until the processing of the print job ends. On the other hand, if it is determined that the print processing apparatus 400 is currently processing no print job (No in step S304), then the processing advances to step S305.

In step S305, the CPU 401 determines whether the user-set paper has been registered in the paper information database 1502 of the MFP 100 stored in the resource management unit 112. If it is determined that no user-set paper has been registered in the paper information database 1502 of the MFP 100 stored in the resource management unit 112 (No in step S305), then the processing ends there. On the other hand, if it is determined that the user-set paper has been registered in the paper information database 1502 of the MFP 100 stored in the resource management unit 112 (Yes in step S305), then the processing advances to step S306.

In step S306, the CPU 401 deletes the user-set paper registered in the paper information database 1502 of the MFP 100 stored in the resource management unit 112. At the same time, the CPU 401 deletes the user-set paper registered in the paper information database 1501 of the print processing apparatus 400.

To paraphrase this, in step S301, the CPU 401 acquires the status of the MFP 100. In steps S302 and S303, the CPU 401 determines whether any print job currently printed or waiting to be printed exists in the MFP 100 (fourth determination processing).

In step S304, the CPU 401 determines whether the print processing apparatus 400 is currently processing any print job (fifth determination processing). If it is determined that no print job currently printed or waiting to be printed exists in the MFP 100 and that no print job is currently processed on the print processing apparatus 400 (No in steps S301 and S304), then in step S306, the CPU 401 deletes the paper type information corresponding to the user-set paper registered in the paper information database 1502 of the MFP 100.

By executing the above-described processing, the CPU 401 can delete the user-set paper registered in the paper information database 1502 of the print processing apparatus 400 from the print processing apparatus 400.

In the above-described exemplary embodiment of the present invention, the MFP 100 is an MFP. However, the MFP 100 is not limited to an MFP. More specifically, an SFP can be used as the MFP 100.

As described above, according to the present exemplary embodiment, print data including a paper type not included in the paper information database of the print processing apparatus and the paper information database of the printing apparatus can be printed on the printing apparatus. Accordingly, the present exemplary embodiment can construct a printing system capable of corresponding to printing that uses various types of paper.

In addition, in the above-described exemplary embodiment of the present invention, the print processing apparatus makes a paper request to the user according to the status of processing of the printing apparatus. Accordingly, the user can replenish the paper during printing. Therefore, the printing can be continued without suspending the processing currently executed on the printing apparatus.

As a result, downtime on the printing apparatus, which may otherwise occur when the user replenishes the paper to the paper feed source (the paper storage unit), can be prevented. Accordingly, the productivity of the printing apparatus can be effectively improved.

The configuration and the content of the above-described various data are not limited to those described above. More specifically, various data used in the present invention can have various other configurations and contents according to the use and the object of the data.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-237099 filed Oct. 22, 2010, which is hereby incorporated by reference herein in its entirety.

What is claimed is:

1. A print processing apparatus capable of transmitting a received print job to a printing apparatus, the print processing apparatus comprising:
    a storage unit configured to store sheet information including attribute information indicating a sheet attribute;
    a receiving unit configured to receive a print job in which attribute information is designated;
    a transmitting unit configured to transmit the received print job to the printing apparatus;
    a determining unit configured to determine whether sheet information including the attribute information designated in the received print job is stored in the storage unit;
    a generating unit configured to generate new sheet information based on the attribute information designated in the received print job in a case where the determining unit determines that the sheet information including the attribute information designated in the received print job is not stored in the storage unit; and
    a control unit configured to cause both of the storage unit and the printing apparatus to store the new sheet information generated by the generating unit.

2. The print processing apparatus according to claim 1, wherein the attribute information is information indicating one or more of a grammage of the sheet, a surface smoothness of the sheet, a shape of the sheet, and a name of the sheet.

3. The print processing apparatus according to claim 1, wherein the sheet information includes attribute information and processing information indicating an adjustment value necessary for executing printing, and
    the generating unit generates the new sheet information by adding processing information to the attribute information designated in the received print job.

4. A method for transmitting a received print job to a printing apparatus, the method comprising:
    storing sheet information including attribute information indicating a sheet attribute,
    receiving a print job in which attribute information is designated;
    transmitting the received print job to the printing apparatus;
    determining whether sheet information including the attribute information designated in the received print job is stored in a storage unit;
    generating new sheet information based on the attribute information designated in the received print job in a case where it is determined that the sheet information including the attribute information designated in the received print job is not stored in the storage unit; and
    causing both of a storage unit of a print processing apparatus and the printing apparatus to store the new sheet information generated.

5. A non-transitory computer-readable storage medium storing instructions which, when executed by a computer, cause the computer to perform operations of the method according to claim 4.

6. The print processing apparatus according to claim 3, wherein the processing information is information indicating one or more of a creeping correction amount, a curl correction amount, and a paper separation fan air flow amount.

7. The print processing apparatus according to claim 6, further comprising:
    a selecting unit configured to select one piece of sheet information from among a plurality of sheet information pieces stored in the storage unit,
    wherein the generating unit generates the new sheet information by adding processing information included in the sheet information selected by the selecting unit to the attribute information designated in the received print job.

8. The print processing apparatus according to claim 7, wherein the selecting unit selects one piece of sheet information from among the plurality of sheet information pieces stored in the storage unit based on the attribute information designated in the received print job.

9. The print processing apparatus according to claim 1, wherein, in a case where the determining unit determines that the sheet information including the attribute information designated in the received print job is stored in the storage unit, the transmitting unit transmits the received print job to the printing apparatus while the generating unit does not generate the new sheet information.

10. The print processing apparatus according to claim 1, wherein the control unit causes both of the storage unit and the printing apparatus to store the new sheet information generated by the generating unit, and then the transmitting unit transmits the received print job to the printing apparatus.

11. A printing system comprising:
    a storage unit configured to store sheet information including attribute information indicating a sheet attribute and processing information indicating an adjustment value necessary for executing printing;

a receiving unit configured to receive a print job in which attribute information is designated;

a determining unit configured to determine whether sheet information including the attribute information designated in the received print job is stored in the storage unit;

a generating unit configured to generate new sheet information by adding processing information to the attribute information designated in the received print job in a case where the determining unit determines that the sheet information including the attribute information designated in the received print job is not stored in the storage unit;

a control unit configured to cause the storage unit to store the new sheet information generated by the generating unit; and a printing unit configured to perform printing based on the received print job.

12. The printing system according to claim 11, wherein the attribute information is information indicating one or more of a grammage of the sheet, a surface smoothness of the sheet, a shape of the sheet, and a name of the sheet.

13. The printing system according to claim 11, wherein the processing information is information indicating one or more of a creeping correction amount, a curl correction amount, and a paper separation fan air flow amount.

14. The printing system according to claim 11, further comprising:

a selecting unit configured to select one piece of sheet information from among a plurality of sheet information pieces stored in the storage unit, wherein the generating unit generates the new sheet information by adding processing information included in the sheet information selected by the selecting unit to the attribute information designated in the received print job.

15. The printing system according to claim 14, wherein the selecting unit selects one piece of sheet information from among the plurality of sheet information pieces stored in the storage unit based on the attribute information designated in the received print job.

16. The printing system according to claim 11, wherein, in a case where the determining unit determines that the sheet information including the attribute information designated in the received print job is stored in the storage unit, the printing unit performs printing based on the received print job while the generating unit does not generate the new sheet information.

17. A printing method comprising:

storing sheet information including attribute information indicating a sheet attribute and processing information indicating an adjustment value necessary for executing printing;

receiving a print job in which attribute information is designated;

determining whether sheet information including the attribute information designated in the received print job is stored in a storage unit;

generating new sheet information by adding processing information to the attribute information designated in the received print job in a case where it is determined that the sheet information including the attribute information designated in the received print job is not stored in the storage unit;

causing the storage unit to store the new sheet information generated by the generating unit; and printing based on the received print job.

18. A non-transitory computer-readable storage medium storing instructions which, when executed by a computer, cause the computer to perform operations of the method according to claim 17.

* * * * *